(12) United States Patent
Zhang et al.

(10) Patent No.: US 11,736,722 B2
(45) Date of Patent: Aug. 22, 2023

(54) PALETTE PREDICTOR SIZE ADAPTATION IN VIDEO CODING

(71) Applicant: Bytedance Inc., Los Angeles, CA (US)

(72) Inventors: Li Zhang, San Diego, CA (US); Weijia Zhu, San Diego, CA (US); Jizheng Xu, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/692,929

(22) Filed: Mar. 11, 2022

(65) Prior Publication Data

US 2022/0201300 A1 Jun. 23, 2022

Related U.S. Application Data

(63) Continuation of application No. PCT/US2020/050451, filed on Sep. 11, 2020.

(30) Foreign Application Priority Data

Sep. 12, 2019 (WO) ................ PCT/CN2019/105554

(51) Int. Cl.
*H04N 19/46* (2014.01)
*H04N 19/593* (2014.01)
(Continued)

(52) U.S. Cl.
CPC ........... *H04N 19/593* (2014.11); *G06T 9/004* (2013.01); *G06T 11/001* (2013.01); *G06T 11/40* (2013.01);
(Continued)

(58) Field of Classification Search
CPC ....... G06T 11/001; G06T 11/40; G06T 9/004; H04N 19/119; H04N 19/186; H04N 19/46;
(Continued)

(56) References Cited

U.S. PATENT DOCUMENTS

| 5,936,606 A | 8/1999 | Lie |
| 6,208,350 B1 | 3/2001 | Herrera |

(Continued)

FOREIGN PATENT DOCUMENTS

| JP | 2020017970 A | 1/2020 |
| WO | 2014165789 A1 | 10/2014 |

(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.http://phenix.int-evry.fr/jvet/doc_end_user/documents/15_Gothenburg/wg11/JVET-O2001-v14.zip.

(Continued)

*Primary Examiner* — Tsion B Owens
(74) *Attorney, Agent, or Firm* — Perkins Coie LLP

(57) ABSTRACT

In one example aspect, a method of video processing includes performing a conversion between a current block in video unit of a video and a bitstream of the video using a palette mode in which a palette of representative sample values is used for coding the current block. During the conversion, a predictor palette is used for predicting the palette of representative sample values, and wherein a size of the predictor palette is adaptively adjusted according to a rule.

20 Claims, 21 Drawing Sheets

(51) Int. Cl.
  *H04N 19/105* (2014.01)
  *H04N 19/132* (2014.01)
  *H04N 19/176* (2014.01)
  *H04N 19/186* (2014.01)
  *H04N 19/169* (2014.01)
  *G06T 9/00* (2006.01)
  *G06T 11/00* (2006.01)
  *G06T 11/40* (2006.01)
  *H04N 19/119* (2014.01)
  *H04N 19/159* (2014.01)
  *G06V 10/20* (2022.01)

(52) U.S. Cl.
  CPC ........... *G06V 10/20* (2022.01); *H04N 19/105* (2014.11); *H04N 19/119* (2014.11); *H04N 19/132* (2014.11); *H04N 19/159* (2014.11); *H04N 19/176* (2014.11); *H04N 19/186* (2014.11); *H04N 19/1883* (2014.11); *H04N 19/46* (2014.11)

(58) Field of Classification Search
  CPC .. H04N 19/182; H04N 19/132; H04N 19/159; H04N 19/105; H04N 19/70; H04N 19/176; H04N 19/1883; H04N 19/593; G06V 10/20
  See application file for complete search history.

(56) References Cited

U.S. PATENT DOCUMENTS

| | | | |
|---|---|---|---|
| 6,237,079 B1 | 5/2001 | Stoney |
| 6,347,157 B2 | 2/2002 | Chui |
| 6,937,759 B2 | 8/2005 | Ridge |
| 7,072,512 B2 | 7/2006 | Mehotra |
| 7,143,353 B2 | 11/2006 | McGee et al. |
| 7,302,006 B2 | 11/2007 | Apostolopoulos et al. |
| 7,414,632 B1 | 8/2008 | Piazza et al. |
| 7,596,180 B2 | 9/2009 | Sullivan et al. |
| 7,634,011 B2 | 12/2009 | Sullivan |
| 7,649,943 B2 | 1/2010 | Speed et al. |
| 7,660,516 B2 | 2/2010 | McCrossan et al. |
| 7,668,242 B2 | 2/2010 | Sullivan et al. |
| 8,369,682 B2 | 2/2013 | McCrossan et al. |
| 9,116,634 B2 | 8/2015 | Drieve et al. |
| 9,343,076 B2 | 5/2016 | Davis |
| 9,477,423 B2 | 10/2016 | Cai et al. |
| 9,501,401 B2 | 11/2016 | Wang et al. |
| 9,516,342 B2 | 12/2016 | Gisquet et al. |
| 9,558,567 B2 | 1/2017 | Guo et al. |
| 9,609,336 B2 | 3/2017 | Topiwala et al. |
| 9,654,777 B2 | 5/2017 | Guo et al. |
| 9,788,004 B2 | 10/2017 | Sun et al. |
| 9,900,617 B2 | 2/2018 | Karczewicz et al. |
| 9,900,624 B2 | 2/2018 | Lai et al. |
| 10,051,277 B2 | 8/2018 | Ye et al. |
| 10,091,512 B2 | 10/2018 | Xu et al. |
| 10,148,981 B2 | 12/2018 | Zhu et al. |
| 10,237,557 B2 | 3/2019 | Hsiang |
| 10,277,910 B2 | 4/2019 | Xiu et al. |
| 10,291,827 B2 | 5/2019 | Ma et al. |
| 10,321,141 B2 | 6/2019 | Chuang et al. |
| 10,356,432 B2 | 7/2019 | Seregin et al. |
| 10,390,028 B2 | 8/2019 | Sun et al. |
| 10,462,475 B2 | 10/2019 | Liu et al. |
| 10,469,848 B2 | 11/2019 | Lai et al. |
| 10,477,203 B2 | 11/2019 | Chuang et al. |
| 10,484,686 B2 | 11/2019 | Xiu et al. |
| 10,638,143 B2 | 4/2020 | Ma et al. |
| 10,659,783 B2 | 5/2020 | Li et al. |
| 10,666,974 B2 | 5/2020 | Chuang et al. |
| 10,681,383 B2 | 6/2020 | Ye et al. |
| 10,715,801 B2 | 7/2020 | Lai et al. |
| 10,735,764 B2 | 8/2020 | Tsai et al. |
| 10,812,817 B2 | 10/2020 | Li et al. |
| 10,951,895 B2 | 3/2021 | Sun et al. |
| 11,025,905 B2 | 6/2021 | Ye et al. |
| 2004/0213469 A1 | 10/2004 | Apostolopoulos et al. |
| 2008/0238939 A1 | 10/2008 | Tamura |
| 2013/0317833 A1 | 11/2013 | Davis |
| 2014/0301475 A1 | 10/2014 | Guo et al. |
| 2015/0010087 A1 | 1/2015 | Funnell |
| 2015/0016501 A1 | 1/2015 | Guo et al. |
| 2015/0110181 A1 | 4/2015 | Saxena et al. |
| 2015/0181208 A1 | 6/2015 | Park et al. |
| 2015/0281728 A1 | 10/2015 | Karczewicz et al. |
| 2015/0341643 A1 | 11/2015 | Xu et al. |
| 2015/0381994 A1 | 12/2015 | Yu et al. |
| 2016/0100179 A1 | 4/2016 | He et al. |
| 2016/0100184 A1 | 4/2016 | Liu et al. |
| 2016/0100193 A1 | 4/2016 | Mishra et al. |
| 2016/0227239 A1 | 8/2016 | Pu et al. |
| 2016/0309172 A1 | 10/2016 | Laroche et al. |
| 2016/0330455 A1 | 11/2016 | Lin et al. |
| 2017/0078683 A1 | 3/2017 | Seregin et al. |
| 2017/0238001 A1 | 8/2017 | Li et al. |
| 2017/0257630 A1 | 9/2017 | Lai et al. |
| 2017/0318301 A1 | 11/2017 | Li et al. |
| 2017/0353730 A1 | 12/2017 | Liu et al. |
| 2017/0374384 A1 | 12/2017 | Xiu et al. |
| 2018/0041757 A1 | 2/2018 | Liu et al. |
| 2018/0077411 A1 | 3/2018 | Gisquet et al. |
| 2018/0152714 A1 | 5/2018 | Sun et al. |
| 2019/0116380 A1* | 4/2019 | Chuang ................ H04N 19/463 |
| 2019/0158854 A1 | 5/2019 | He et al. |
| 2019/0246122 A1 | 8/2019 | Zhang et al. |
| 2020/0092546 A1* | 3/2020 | Ye ........................ H04N 19/593 |
| 2020/0244962 A1 | 7/2020 | Li et al. |
| 2020/0288145 A1 | 9/2020 | Chuang et al. |
| 2020/0322630 A1 | 10/2020 | Tsai et al. |
| 2022/0201311 A1 | 6/2022 | Zhang et al. |
| 2022/0210447 A1 | 6/2022 | Zhang et al. |

FOREIGN PATENT DOCUMENTS

| | | |
|---|---|---|
| WO | 2015041647 A1 | 3/2015 |
| WO | 2015179804 A1 | 11/2015 |
| WO | 2016074627 A1 | 5/2016 |
| WO | 2016187567 A2 | 11/2016 |

OTHER PUBLICATIONS

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Kotra et al. "Non-CE5: Chroma QP Derivation Fix for Deblocking Filter (Combination of JVET-P0105 and JVET-P0539)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1001, 2019.

Sarwer et al. "CE2-related: On Maximum Palette Size of VVC," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0291, 2020.

Xiu et al. "Non-CE2: On Signaling of Maximum Palette Size and Maximum Palette Predictor," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0519, 2020.

Zhu et al. "CE8-Related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0258, 2019.

https://vcgit.hhi.fraunhofer.de/jvet/VVCSoftware_VTM/tags/VTM-5.0

International Search Report and Written Opinion from International Patent Application No. PCT/CN2020/142030 dated Apr. 7, 2021 (12 pages).

(56) References Cited

OTHER PUBLICATIONS

International Search Report and Written Opinion from International Patent Application No. PCT/US2020/050181 dated Feb. 19, 2021 (12 pages).
International Search Report and Written Opinion from International Patent Application No. PCT/US2020/050451 dated Dec. 17, 2020 (9 pages).
International Search Report and Written Opinion from International Patent Application No. PCT/US2020/050461 dated Dec. 10, 2020 (9 pages).
Guo et al. "Palette Mode for Screen Content Coding," Joint Collaborative Team on Video Coding, (JCT-VC) of ITU-T SG 16 WP3 and ISO/IEC JTC 1/SC 29/WG 11, 13th Meeting, Incheon KR, Apr. 18-26, 2013, document JCTVC-M0323, 2013.
Guo et al. "Color Palette for Screen Content Coding," ICIP 2014.
Hsiang et al. "Run Coding of the Palette Index Map Using a Universal Entropy Coding Scheme," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, document JCTVC-R0136, 2014.
Kim et al. "Non-SCCE3: High Throughput Palette Coding," Joint Collaborative Team on Video Coding (JCT-VC) of ITU-T SG 16 WP 3 and ISO/IEC JTC 1/SC 29/WG 11 18th Meeting, Saporro, JP, Jun. 30-Jul. 9, 2014, document JCTVC-R0232, 2014.
Laroche et al. "AhG10: Run Coding for Palette Mode," Joint Collaborative Team on Video Coding (JCT-VC) of ITU-T SG 16 WP 3 and ISO/IEC JTC 1/SC 29/WG 11, 17th Meeting, Valencia, ES, Mar. 27-Apr. 4, 2014, document JCTVC-Q0066, 2014.
Ma et al. "Advanced Screen Content Coding Using Color Table and Index Map," IEEE Transactions on Image Processing, Oct. 2014, 23(10):4393-4412.
Pu et al. "Non-CE6: Syntax Redundancy Fixes for Palette Mode," Joint Collaborative Team on Video Coding (JCT-VC) of ITU-T SG 16 WP 3 and ISO/IEC JTC 1/SC 29/WG 11, 19th Meeting, Stasburg, FR, Oct. 17-24, 2014, document JCTVC-S0110, 2014.
Sun et al. "Palette Mode—A New Coding Tool in Screen Content Coding Extensions of HEVC," 2015 IEEE International Conference on Image Processing (ICIP), 2015, pp. 2409-2413.
Sun et al. "CE1-Related: Harmonization between JCTVC-T0065 Non CE1: Grouping Palette Indices at Front of CE1 Test A.1.5," Joint Collaborative Team on Video Coding (JCT-VC) of ITU-T SG WP 3 and ISO-IEC JTC 1/SC 29/WG 11 20th Meeting, Geneva, CH Feb. 10-18, 2015, document JCTVC-T0233, 2015.
Xiu et al. "Removal of Parsing Dependency in Palette-Based Coding," Joint Collaborative Team on Vide oCoding (KCT-VC) of ITU-T SG 16 WP 3 and ISO/IEC JTC 1/SC 29/WG 11 19th Meeting, Strasbourg, FR, Oct. 17-24, 2014, document JCTVC-S0181, 2014.
Non Final Office Action from U.S. Appl. No. 17/692,782 dated Jun. 13, 2022.
Non Final Office Action from U.S. Appl. No. 17/693,081 dated Jun. 24, 2022.
Chao et al. "CE8: Palette Mode in HEVC (CE8-2.1)," Joint Video Experts Team (JVET) of ITU-T SG 16 WP 3 and ISO/IEC JTC 1/SC 29/WG 11 14th Meeting, Geneva, CH Mar. 19-27, 2019, document JVET-N0344, 2019.
Misra et al. "Palette SPS Syntax Cleanup," Joint Collaborative Team on Video Coding (JCT-VC) of ITU-T SG 16 WP 3 and ISO/IEC JTC 1/SC 29/WG 11 20th Meeting, Geneva, CH, Feb. 10-18, 2005, document JCTVC-T0134, 2015.
Partial Supplementary European Search Report from European Patent Application No. 20863978.1 dated Dec. 21, 2022 (15 pages).
Extended European Search Report from European Patent Application No. 20863794.2 dated Jan. 2, 2023 (13 pages).
Non Final Office Action from U.S. Appl. No. 17/692,782 dated Feb. 13, 2023.
Pu et al., "Palette Mode Coding in HEVC Screen Content Coding Extension", IEEE Journal on Emerging and Selected Topics in Circuits and Systems, IEEE, Nov. 18, 2016 6(4):420-432, ISSN: 2156-3357, Figures 1-6. (cited in JP2022-516099 OA1 dated Mar. 28, 2023).
Sun et al., "Analysis of Palette Mode on Versatile Video Coding", Proceedings of 2019 IEEE Conference on Multimedia Information Processing and Retrieval (MIPR), Mar. 30, 2019 IEEE, pp. 455-458, Figures 1-4. (cited in JP2022-516099 OA1 dated Mar. 28, 2023).
Xu et al. "Overview of the Emerging HEVC Screen Content Coding Extension," IEEE Transactions on Circuits and Systems for Video Technology, IEEE, Sep. 14, 2015, 26(1):50-62, ISSN: 1051-8215, (In particular, Sections III. B. and IV.C. and Figures 3-6.) (cited in JP2022-516099 OA1 dated Mar. 28, 2023).

* cited by examiner

FIG. 3

1300 performing a conversion between a current block of a video and a coded representation of the video using a palette mode in which a palette of representative sample values is used for coding the current block, where during the conversion, a predictor palette is used for predicting the palette of representative sample values, and whether a change to the predictor palette is to be performed is determined according to a color component of the current block.

1500 performing a conversion between a current block in a video unit of a video and a coded representation of the video using a palette mode in which a palette of representative sample values is used for coding the current block, where during the conversion, a predictor palette is used for predicting the palette of representative sample values. The predictor palette is reset or re-initialized prior to a conversion of a first block in the video unit or after a conversion of a last video block in a previous video unit according to a rule

1700 performing a conversion between a current block of a video and a coded representation of the video using a palette mode in which a palette of representative sample values is used for coding the current block, where during the conversion, a predictor palette is used for predicting the palette of representative sample values, and a counter is maintained for each entry of the predictor palette indicating how often the corresponding entry is used.

PALETTE PREDICTOR SIZE ADAPTATION IN VIDEO CODING

CROSS REFERENCE TO RELATED APPLICATIONS

This application is a continuation of International Application No. PCT/US2020/050451, filed on Sep. 11, 2020, which claims the priority to and benefits of International Patent Application No. PCT/CN2019/105554, filed on Sep. 12, 2019. For all purposes under the law, the entire disclosure of the aforementioned applications are incorporated by reference as part of the disclosure of this application.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes performing a conversion between a current block of a video and a coded representation of the video using a palette mode in which a palette of representative sample values is used for coding the current block. During the conversion, a predictor palette is used for predicting the palette of representative sample values. Updating of the predictor palette after the conversion of the current block is disabled according to a rule based on a characteristic of the current block.

In another representative aspect, the disclosed technology may be used to provide a method for video processing. This method includes performing a conversion between a current block of a video and a coded representation of the video using a palette mode in which a palette of representative sample values is used for coding the current block. During the conversion, a predictor palette is used for predicting the palette of representative sample values. Whether a change to the predictor palette is to be performed is determined according to a color component of the current block.

In another representative aspect, the disclosed technology may be used to provide a method for video processing. This method includes performing a conversion between a current block in a video unit of a video and a coded representation of the video using a palette mode in which a palette of representative sample values is used for coding the current block. During the conversion, multiple predictor palettes are used for predicting the palette of representative sample values.

In another representative aspect, the disclosed technology may be used to provide a method for video processing. This method includes performing a conversion between a current block in a video unit of a video and a coded representation of the video using a palette mode in which a palette of representative sample values is used for coding the current block. During the conversion, a predictor palette is used for predicting the palette of representative sample values. The predictor palette is reset or re-initialized prior to a conversion of a first block in the video unit or after a conversion of a last video block in a previous video unit according to a rule.

In another representative aspect, the disclosed technology may be used to provide a method for video processing. This method includes performing a conversion between a video unit of a video and a coded representation of the video using a palette mode. The video unit comprises multiple blocks. During the conversion, a shared predictor palette is used by all of the multiple blocks for predicting a palette of representative sample values for each of the multiple blocks in the palette mode.

In another representative aspect, the disclosed technology may be used to provide a method for video processing. This method includes performing a conversion between a current block of a video and a coded representation of the video using a palette mode in which a palette of representative sample values is used for coding the current block. During the conversion, a predictor palette is used for predicting the palette of representative sample values, and a counter is maintained for each entry of the predictor palette indicating how often the corresponding entry is used.

In another representative aspect, the disclosed technology may be used to provide a method for video processing. This method includes performing a conversion between a current block of a video and a coded representation of the video using a palette mode in which a palette of representative sample values is used for coding the current block for predicting a palette of representative sample values for the current block. A number of entries of the palette signaled in the coded representation is within a range of [0, a maximum allowed size of a palette—a number of palette entries derived during the conversion].

In another representative aspect, the disclosed technology may be used to provide a method for video processing. This method includes performing a conversion between a current block in video unit of a video and a coded representation of the video using a palette mode in which a palette of representative sample values is used for coding the current block. During the conversion, a predictor palette is used for predicting the palette of representative sample values, and a size of the predictor palette is adaptively adjusted according to a rule.

In another representative aspect, the disclosed technology may be used to provide a method for video processing. This method includes performing a conversion between a current block in a video unit of a video and a coded representation of the video using a palette mode in which a palette of representative sample values is used for coding the current block. During the conversion, a predictor palette is used for predicting the palette of representative sample values and a size of the palette of representative samples or the predictor palette is determined according to a rule that permits the size to change between video units of the video.

In another representative aspect, the disclosed technology may be used to provide a method for video processing. This method includes performing a conversion between a current block in a video unit of a video and a coded representation of the video using a palette mode in which a palette of representative sample values is used for coding the current block. During the conversion, a predictor palette is used for predicting the palette of representative sample values. The predictor palette is re-initialized upon a condition being satisfied, where the condition is satisfied in case the video unit is a first video unit in a video unit row and a syntax element is included in the coded representation indicating that a wavefront parallel processing is enabled for the video unit.

In another representative aspect, the disclosed technology may be used to provide a method for video processing. This method includes performing a conversion between a video block in a video unit and a coded representation of the video block using a palette mode, wherein, during the conversion, a predictor palette is used for predicting a current palette information of the video block, and further wherein the predictor palette is selectively reset prior to the conversion between the video block and the bitstream representation of the video block.

In another representative aspect, the disclosed technology may be used to provide another method for video processing. This method includes performing a conversion between a video block in a video unit and a coded representation of the video block using a palette mode, wherein, during the conversion, a predictor palette is used for predicting a current palette information of the video block, and further wherein the predictor palette is a shared predictor palette when multiple coding units of the video unit have a commonly shared region.

In another representative aspect, the disclosed technology may be used to provide another method for video processing. This method includes performing a conversion between a video block in a video unit and a coded representation of the video block using a palette mode, wherein, during the conversion, a predictor palette is used for predicting a current palette information of the video block, and further wherein a size of predictor palette is adaptively changed in accordance with one or more conditions.

In another representative aspect, the disclosed technology may be used to provide another method for video processing. This method includes performing a conversion between a video block in a video unit and a coded representation of the video block using a palette mode, wherein, during the conversion, a predictor palette is used for predicting a current palette information of the video block, and further wherein the predictor palette is updated based on a size or a number of entries in the predictor palette.

In another representative aspect, the disclosed technology may be used to provide another method for video processing. This method includes performing a conversion between a video block in a video unit and a coded representation of the video block using a palette mode, wherein, during the conversion, a predictor palette is used for predicting a current palette information of the video block, and further wherein entries of the predictor palette are re-ordered or modified.

In another representative aspect, the disclosed technology may be used to provide another method for video processing. This method includes performing a conversion between a video block in a video unit and a coded representation of the video block using a palette mode, wherein, during the conversion, a predictor palette is used for predicting a current palette information of the video block, and further wherein a usage of the predictor palette is indicated by maintaining a counter that keep track of a number of times the predictor palette is used.

In another example aspect, the above-described methods may be implemented by a video decoder apparatus that comprises a processor.

In another example aspect, the above-described methods may be implemented by a video encoder apparatus that comprises a processor.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 3 shows an example of a horizontal traverse scan and a vertical traverse scan.

FIG. 13 is a flowchart representation of another method of video processing in accordance with the present technology.

FIG. 15 is a flowchart representation of another method of video processing in accordance with the present technology.

FIG. 17 is a flowchart representation of another method of video processing in accordance with the present technology.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2. Palette Mode

2.1 Palette Mode in HEVC Screen Content Coding Extensions (HEVC-SCC)

2.1.1. Concept of Palette Mode

Figure 1:
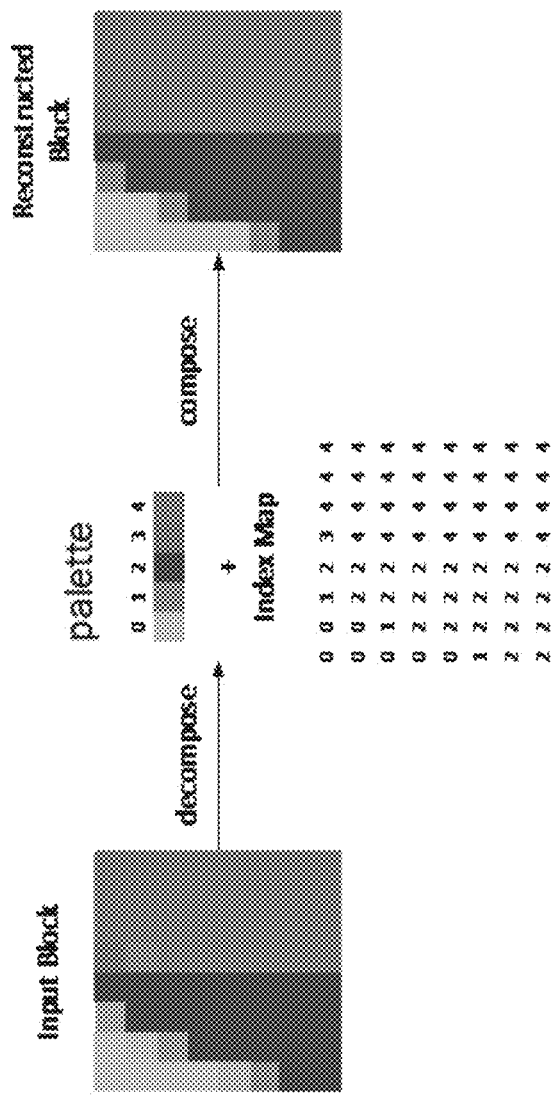
FIG. 1 shows an example of a block coded in palette mode.

The basic idea behind a palette mode is that the pixels in the CU are represented by a small set of representative colour values. This set is referred to as the palette. And it is also possible to indicate a sample that is outside the palette by signalling an escape symbol followed by (possibly quantized) component values. This kind of pixel is called escape pixel. The palette mode is illustrated in FIG. 1. As depicted in FIG. 1, for each pixel with three coloc components (luma, and two chroma components), an index to the palette is founded, and the block could be reconstructed based on the founded values in the palette.

2.1.2. Coding of the Palette Entries

For a palette coded blocks, the following key aspects are introduced:

1) Construct the current palette based on a predictor palette and new entries signaled for current palette, if existing.
2) Classify the current samples/pixels to two categories: one ($1^{st}$ category) to include samples/pixels in the current palette, and the other ($2^{nd}$ category) to include samples/pixels beyond the current palette.
   a. For the samples/pixels in the $2^{nd}$ category, quantization (at encoder) is applied to samples/pixels and quantized values are signaled; and dequantization (at decoder) is applied

2.1.2.1. Predictor Palette

For coding of the palette entries, a predictor palette is maintained which is updated after decoding a palette coded block.

2.1.2.1.1. Initialization of Predictor Palette

The predictor palette is initialized at the beginning of each slice and each tile.

The maximum size of the palette as well as the predictor palette is signaled in the SPS. In HEVC-SCC, a palette_predictor_initializer_present_flag is introduced in the PPS. When this flag is 1, entries for initializing the predictor palette are signaled in the bitstream.

Depending on the value of the palette_predictor_initializer_present_flag, the size of predictor palette is reset to 0 or initialized using the predictor palette initializer entries signaled in the PPS. In HEVC-SCC, a predictor palette initializer of size 0 was enabled to allow explicit disabling of the predictor palette initialization at the PPS level.

Corresponding syntax, semantics and decoding process are defined as follows. The newly added texts are shown in bold and underline italicised text. Any deleted texts are marked by [[ ]].

7.3.2.2.3 Sequence Parameter Set Screen Content Coding Extension Syntax

| sps_scc_extension( ) { | Descriptor |
|---|---|
| sps_curr_pic_ref_enabled_flag | u(1) |
| *palette_mode_enabled_flag* | *u(1)* |
| *if( palette_mode_enabled_flag ) {* | |
| *palette_max_size* | *ue(v)* |
| *delta_palette_maxpredictor_size* | *ue(v)* |
| *sps_palette_predictor_initializer_present_flag* | *u(1)* |
| *if( sps_palette_predictorinitializer_present_flag ) {* | |
| *sps_num_palette_predictorinitializer_minus1* | *ue(v)* |
| *numComps = ( chromaformat_idc = = 0 ) ? 1 : 3* | |
| *for( comp = 0; comp <numComps; comp++ )* | |
| *for( i = 0; i <= sps_numpalette_predictor_initializerminus1; i++)* | |
| *sps_palette_predictoinitializers[ comp ][ i ]* | *u(v)* |
| *}* | |
| *}* | |
| motion_vector_resolution_control_idc | u(2) |
| intra_boundary_filtering_disabled_flag | u(1) |
| } | | palette_mode_enabled_flag equal to 1 specifies that the decoding process for palette mode may be used for intra blocks. palette_mode_enabled_flag equal to 0 specifies that the decoding process for palette mode is not applied. When not present, the value of palette_mode_enabled_flag is inferred to be equal to 0.

palette_max_size specifies the maximum allowed palette size. When not present, the value of palette_max_size is inferred to be 0.

delta_palette_max_predictor_size specifies the difference between the maximum allowed palette predictor size and the maximum allowed palette size. When not present, the value of delta_palette_max_predictor_size is inferred to be 0. The variable PaletteMaxPredictorSize is derived as follows:

$$PaletteMaxPredictorSize = \quad\quad (2\text{-}1)$$
$$palette\_max\_size + delta\_palette\_max\_predictor\_size$$

It is a requirement of bitstream conformance that the value of delta_palette_max_predictor_size shall be equal to 0 when palette_max_size is equal to 0.

sps_palette_predictor_initializer_present_flag equal to 1 specifies that the sequence palette predictors are initialized using the sps_palette_predictor_initializers specified in clause sps_palette_predictor_initializer_flag equal to 0 specifies that the entries in the sequence palette predictor are initialized to 0. When not present, the value of sps_palette_predictor_initializer_flag is inferred to be equal to 0.

It is a requirement of bitstream conformance that the value of sps_palette_predictor_initializer_present_flag shall be equal to 0 when palette_max_size is equal to 0.

sps_num_palette_predictor_initializer_minus1 plus 1 specifies the number of entries in the sequence palette predictor initializer It is a requirement of bitstream conformance that the value of sps_num_palette_predictor_initializer_minus1 plus 1 shall be less than or equal to PaletteMaxPredictorSize.

sps_palette_predictor_initializers[comp][i] specifies the value of the comp-th component of the i-th palette entry in the SPS that is used to initialize the array PredictorPaletteEntries. For values of i in the range of 0 to sps_num_palette_predictor_initializer_minus1, inclusive, the value of the sps_palette_predictor_initializers[0][i] shall be in the range of 0 to $(1<<BitDepth_Y)-1$, inclusive, and the values of sps_palette_predictor_initializers[1][i] and sps_palette_predictor_initializers[2][i] shall be in the range of 0 to $(1<<BitDepth_C)-1$, inclusive.

7.3.2.3.3 Picture Parameter Set Screen Content Coding Extension Syntax

| pps_scc_extension( ) { | Descriptor |
|---|---|
| pps_curr_pic_ref_enabled_flag | u(1) |
| residual_adaptive_colour_transform_enabled_flag | u(1) |
| if( residual_adaptive_colour_transform_enabled_flag ) { | |
|   pps_slice_act_qp_offsets_present_flag | u(1) |
|   pps_act_y_qp_offset_plus5 | se(v) |
|   pps_act_cb_qp_offset_plus5 | se(v) |
|   pps_act_cr_qp_offset_plus3 | se(v) |
| } | |
| *pps_palette_predictor_initiator_present_flag* | *u(1)* |
| *if( pps_palette_predictor_initializer_present_flag ) {* | |
|   *pps_num_palette_predictor_initializer* | *ue(v)* |

| pps_scc_extension( ) { | Descriptor |
|---|---|
|   *if( pps_num_palette_predictor_initializer > 0 ) {* | |
|     *monochrome_palette_flag* | *u(1)* |
|     *luma_bit_depth_entry_minus8* | *ue(v)* |
|     *if( !monochrome_palette_flag )* | |
|       *chroma_bit_depth_entry_minus8* | *ue(v)* |
|     *numComps = monochrome_palette_flag ? 1 : 3* | |
|     *for( comp = 0; comp numComps; comp++ )* | |
|       *for( i = 0; i < pps_num_palette_predictor_initializer; i++ )* | |
|         *pps_palette_predictor u(v)* | *u(v)* |
|   *}* | |
| } | | pps_palette_predictor_initializer_present_flag equal to 1 specifies that the palette predictor initializers used for the pictures referring to the PPS are derived based on the palette predictor initializers specified by the PPS. pps_palette_predictor_initializer_flag equal to 0 specifies that the palette predictor initializers used for the pictures referring to the PPS are inferred to be equal to those specified by the active SPS. When not present, the value of pps_palette_predictor_initializer_present_flag is inferred to be equal to 0.

It is a requirement of bitstream conformance that the value of pps_palette_predictor_initializer_present_flag shall be equal to 0 when either palette_max_size is equal to 0 or palette_mode_enabled_flag is equal to 0.

pps_num_palette_predictor_initializer specifies the number of entries in the picture palette predictor initializer It is a requirement of bitstream conformance that the value of pps_num_palette_predictor_initializer shall be less than or equal to PaletteMaxPredictorSize.

The palette predictor variables are initialized as follows:
  If the coding tree unit is the first coding tree unit in a tile, the following applies:
    The initialization process for palette predictor variables is invoked as specified in clause 9.3.2.3.
  Otherwise, if entropy_coding_sync_enabled_flag is equal to 1 and either CtbAddrinRs % PicWidthInCtbsY is equal to 0 or TileId[CtbAddrInTs] is not equal to TileId[CtbAddrRsToTs[CtbAddrInRs−1]], the following applies:
    The location (xNbT, yNbT) of the top-left luma sample of the spatial neighbouring block T (FIG. 2) is derived using the location (x0, y0) of the top-left luma sample of the current coding tree block as follows:

$$(xNbT, yNbT) = (x0 + CtbSizeY, y0 - CtbSizeY) \quad\quad (9\text{-}3)$$

The availability derivation process for a block in z-scan order as specified in clause 6.4.1 is invoked with the location (xCurr, yCurr) set equal to (x0, y0) and the neighbouring location (xNbY, yNbY) set equal to (xNbT, yNbT) as inputs, and the output is assigned to availableFlagT.
    The synchronization process for context variables, Rice parameter intialization states, and palette predictor variables is invoked as follows:
      If availableFlagT is equal to 1, the synchronization process for context variables, Rice parameter initialization states, and palette predictor variables as specified in clause 9.3.2.5 is invoked with TableStateIdxWpp, TableMpsValWpp, TableStatCoeffWpp, PredictorPaletteSizeWpp, and TablePredictorPaletteEntriesWpp as inputs.

Otherwise, the following applies:
The initialization process for palette predictor variables is invoked as specified in clause 9.3.2.3.

Otherwise, if CtbAddrinRs is equal to slice_segment_address and dependent_slice_segment_flag is equal to 1, the synchronization process for context variables and Rice parameter initialization states as specified in clause 9.3.2.5 is invoked with TableStateIdxDs, TableMpsValDs, TableStatCoeffDs, PredictorPaletteSizeDs, and TablePredictorPaletteEntriesDs as inputs.

Otherwise, the following applies:
The initialization process for palette predictor variables is invoked as specified in clause 9.3.2.3.

9.3.2.3 Initialization Process for Palette Predictor Entries

Outputs of this process are the initialized palette predictor variables PredictorPaletteSize and PredictorPaletteEntries. The variable numComps is derived as follows:

$$numComps = (ChromaArrayType == 0)?1:3 \quad (9\text{-}8)$$

If pps_palette_predictor_initializer_present_flag is equal to 1, the following applies:
PredictorPaletteSize is set equal to pps_num_palette_predictor_initializer
The array PredictorPaletteEntries is derived as follows:

$$for(comp = 0; comp < numComps; comp++) \quad (9\text{-}9)$$
$$for(i = 0; i < PredictorPaletteSize; i++)$$
$$PredictorPaletteEntries[comp][i] =$$
$$pps\_palette\_predictor\_initializers[comp][i]$$

Otherwise (pps_palette_predictor_initializer_present_flag is equal to 0), if sps_palette_predictor_initializer_present_flag is equal to 1, the following applies:
PredictorPaletteSize is set equal to sps_num_palette_predictor_initializer_minus1 plus 1.
The array PredictorPaletteEntries is derived as follows:

$$for(comp = 0; comp < numComps; comp++) \quad (9\text{-}10)$$
$$for(i = 0; i < PredictorPaletteSize; i++)$$
$$PredictorPaletteEntries[comp][i] =$$
$$sps\_palette\_predictor\_initializers[comp][i]$$

Otherwise (pps_palette_predictor_initializer_present_flag is equal to 0 and sps_palette_predictor_initializer_present_flag is equal to 0), PredictorPaletteSize is set equal to 0.

2.1.2.1.2. Usage of Predictor Palette

Figure 2:
FIG. 2 shows an example of use of predictor palette to signal palette entries.

For each entry in the palette predictor, a reuse flag is signaled to indicate whether it is part of the current palette. This is illustrated in FIG. 2. The reuse flags are sent using run-length coding of zeros. After this, the number of new palette entries are signaled using Exponential Golomb (EG) code of order 0, e.g., EG-0. Finally, the component values for the new palette entries are signaled.

2.1.2.2. Updating of Predictor Palette

Updating of predictor palette is performed with the follow steps:
(1) before decoding current block, there is a predictor palette, denoted by PltPred0
(2) construct current palette table by inserting those from PltPred0 firstly, followed by new entries for current palette.
(3) Constructing PltPred1:
a. first add those in current palette table (which may include those from PltPred0)
b. if not full, then add un-referenced in PltPred0 according to ascending entry index.

2.1.3. Coding of Palette Indices

Figure 3:
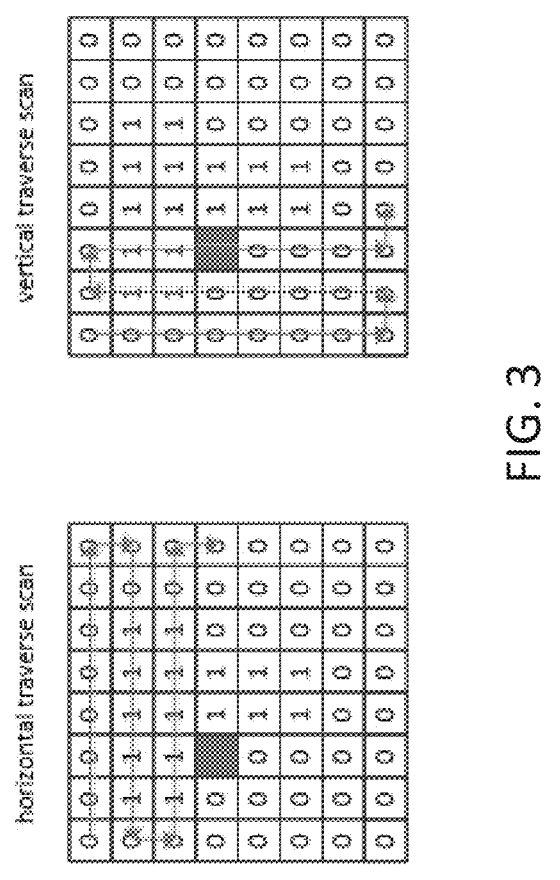

The palette indices are coded using horizontal and vertical traverse scans as shown in FIG. 3. The scan order is explicitly signaled in the bitstream using the palette_transpose_flag. For the rest of the subsection it is assumed that the scan is horizontal.

The palette indices are coded using two palette sample modes: 'COPY_LEFT' and 'COPY_ABOVE'. In the 'COPY_LEFT' mode, the palette index is assigned to a decoded index. In the 'COPY_ABOVE' mode, the palette index of the sample in the row above is copied. For both "COPY_LEFT" and 'COPY_ABOVE' modes, a run value is signaled which specifies the number of subsequent samples that are also coded using the same mode.

Figure 4:
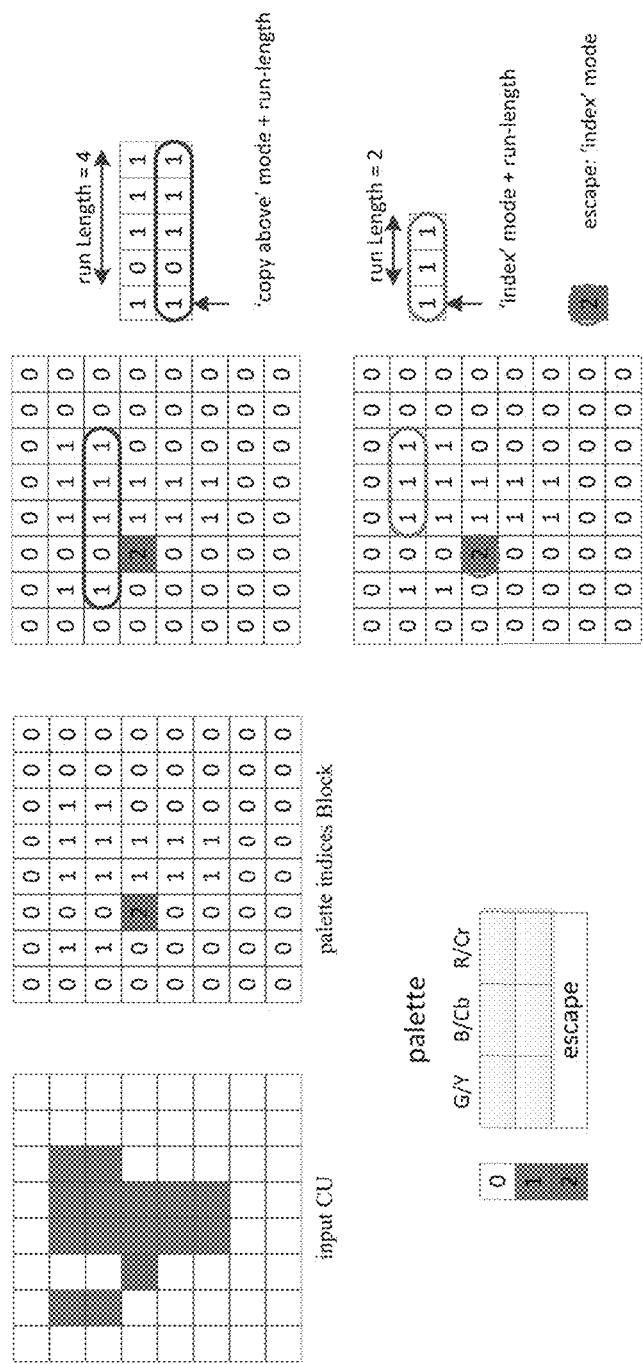
FIG. 4 shows examples of coding of palette indices.

In the palette mode, the value of an index for the escape sample is the number of palette entries. And, when escape symbol is part of the run in 'COPY_LEFT' or 'COPY_ABOVE' mode, the escape component values are signaled for each escape symbol. The coding of palette indices is illustrated in FIG. 4.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode. The binarization of escape samples is EG coding with $3^{rd}$ order, e.g., EG-3.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

In addition, there is an index adjustment process in the palette index coding. When signaling a palette index, the left neighboring index or the above neighboring index should be different from the current index. Therefore, the range of the current palette index could be reduced by 1 by removing one possibility. After that, the index is signaled with truncated binary (TB) binarization.

The texts related to this part is shown as follows, where the CurrPaletteIndex is the current palette index and the adjustedRefPaletteIndex is the prediction index.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
  xcPrev =
x0 +TraverseScanOrder[ log2CbWidth ][ log2bHeight ]
[ PaletteScanPos − 1 ][ 0 ]
  ycPrev =
y0 + TraverseScanOrder[ log2CbWidth ][ log2bHeight ]
[ PaletteScanPos − 1 ][ 1 ]
    if( CopyAboveIndicesFlag[ xcPrev ][ ycPrev ][ = = 0) {
      adjustedRefPaletteIndex = PaletteIndexMap[ xcPrev ]
      [ ycPrev ] {    (7-157)
    }
    else {
      if( !palette_transpose_flag)
        adjustedRefPaletteIndex = PaletteIndexMap[ xC ][ yC − 1 ]
      else
        adjustedRefPaletteIndex = PaletteIndexMap[ xC − 1 ][ yC ]
    }
}
```

When CopyAboveIndicesFlag[xC][yC] is equal to 0, the variable CurrPaletteIndex is derived as follows:

```
if( CurrPaletteIndex >= adjustedRefPaletteIndex )
  CurrPaletteIndex++
```

2.1.3.1. Decoding Process of a Palette Coded Block 1) read prediction information to mark which of entries in the predictor palette will be reused; (palette_predictor_run)
2) read new palette entries for the current block
   a. num_signaled_palette_entries
   b. new_palette_entries
3) construct CurrentPaletteEntries based on a) and b)
4) read escape symbol present flag: palette_escape_val_present_flag to derive the MaxPaletteIndex
5) code how many samples that are not coded with copy mode/run mode
   a. num_palette_indices_minus1
   b. for each sample that is not coded with copy mode/run mode, code the palette_idx_idc in the current plt table 2.2. Palette Mode in VVC 2.2.1. Palette in Dual Tree In VVC, the dual tree coding structure is used on coding the intra slices, so the luma component and two chroma components may have different palette and palette indices. In addition, the two chroma component shares same palette and palette indices.

2.2.2. Palette as a Separate Mode

In some embodiments, the prediction modes for a coding unit can be MODE_INTRA, MODE_INTER, MODE_IBC and MODE_PLT. The binarization of prediction modes is changed accordingly.

When IBC is turned off, on I tiles, the first one bin is employed to indicate whether the current prediction mode is MODE_PLT or not. While on P/B tiles, the first bin is employed to indicate whether the current prediction mode is MODE_INTRA or not. If not, one additional bin is employed to indicate the current prediction mode is MODE_PLT or MODE_INTER.

When IBC is turned on, on I tiles, the first bin is employed to indicate whether the current prediction mode is MODE_IBC or not. If not, the second bin is employed to indicate whether the current prediction mode is MODE_PLT or MODE_INTRA. While on P/B tiles, the first bin is employed to indicate whether the current prediction mode is MODE_INTRA or not. If it's an intra mode, the second bin is employed to indicate the current prediction mode is MODE_PLT or MODE_INTRA. If not, the second bin is employed to indicate the current prediction mode is MODE_IBC or MODE_INTER.

Example syntax texts are shown as follows.

Coding Unit Syntax

| coding_unit( x0, y0, cbWidth, cbHeight, cqtDepth, treeType, modeType ) { | Descriptor |
|---|---|
| chType = treeType = = DUAL_TREE_CHROMA? 1 : 0 | |
| if( slice_type != I \| \| sps_ibc_enabled_flag \| \| sps_palette_enabled_flag) { | |
| if( treeType != DUAL TREE CHROMA && | |
| !( ( ( cbWidth = = 4 && cbHeight = = 4 ) \| \| modeType = = MODE_TYPE_INTRA ) | |
| && !sps_ibc_enabled_flag ) ) | |
| cu_skip_flag[ x0 ][ y0 ] | ae(v) |
| if( cu_skip_flag[ x0 ][ y0 ] = = 0 && slice_type != I | |
| && !( cbWidth = = 4 && cbHeight = = 4 ) && modeType = = MODE_TYPE_ALL ) | |
| pred_mode_flag | ae(v) |
| if( ( ( slice_type = = I && cu_skip_flag[ x0 ][ y0 ] = =0) \| \| | |
| ( slice_type != I && ( CuPredMode[ chType ][ x0 ][ y0 ] != MODE_INTRA \| \| | |

```
coding_unit( x0, y0, cbWidth, cbHeight, cqtDepth, treeType, modeType ) {                                          Descriptor
    ( cbWidth  = = 4   &&   cbHeight = = 4   &&   cu_skip_flag[ x0 ][ y0 ]   = = 0 ) ) ) )   &&
    cbWidth <= 64    &&    cbHeight <=  64  &&   modeType !=  MODE_TYPE _INTER &&
    sps_ibc_enabled_flag && treeType != DUAL_TREE_CHROMA )
    pred_mode_ibc_flag                                                                                             ae(v)
    if( ( ( ( slice_type = = I | | ( cbWidth = = 4 && cbHeight = = 4 ) | | sps_ibc_enabled_flag ) &&
        CuPredMode[ x0 ][ y0 ]             = =              MODE_INTRA )             | |
        ( slice_type != I && !( cbWidth = = 4 && cbHeight = = 4 ) && !sps_ibc_enabled_flag
        && CuPredMode[ x0 ][ y0 ] != MODE_INTRA ) )   &&    sps_palette_enabled_flag   &&
        cbWidth <= 64   cbHeight <= 64   && &&    cu_skip_flag[ x0 ][ y0 ]   = = 0    &&
        modeType != MODE_INTER )
    pred_mode_plt_flag                                                                                             ae(v)
}
...
}
```

2.3. Partitioning of Pictures, Subpictures, Slices, Tiles, Bricks, and CTUs subpicture: An rectangular region of one or more slices within a picture.

slice: An integer number of bricks of a picture that are exclusively contained in a single NAL unit. A slice consists of either a number of complete tiles or only a consecutive sequence of complete bricks of one tile.

tile: A rectangular region of CTUs within a particular tile column and a particular tile row in a picture.

brick: A rectangular region of CTU rows within a particular tile in a picture. A tile may be partitioned into multiple bricks, each of which consisting of one or more CTU rows within the tile. A tile that is not partitioned into multiple bricks is also referred to as a brick. However, a brick that is a true subset of a tile is not referred to as a tile.

brick scan: A specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture.

A picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

A subpicture contains one or more slices that collectively cover a rectangular region of a picture.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 5:
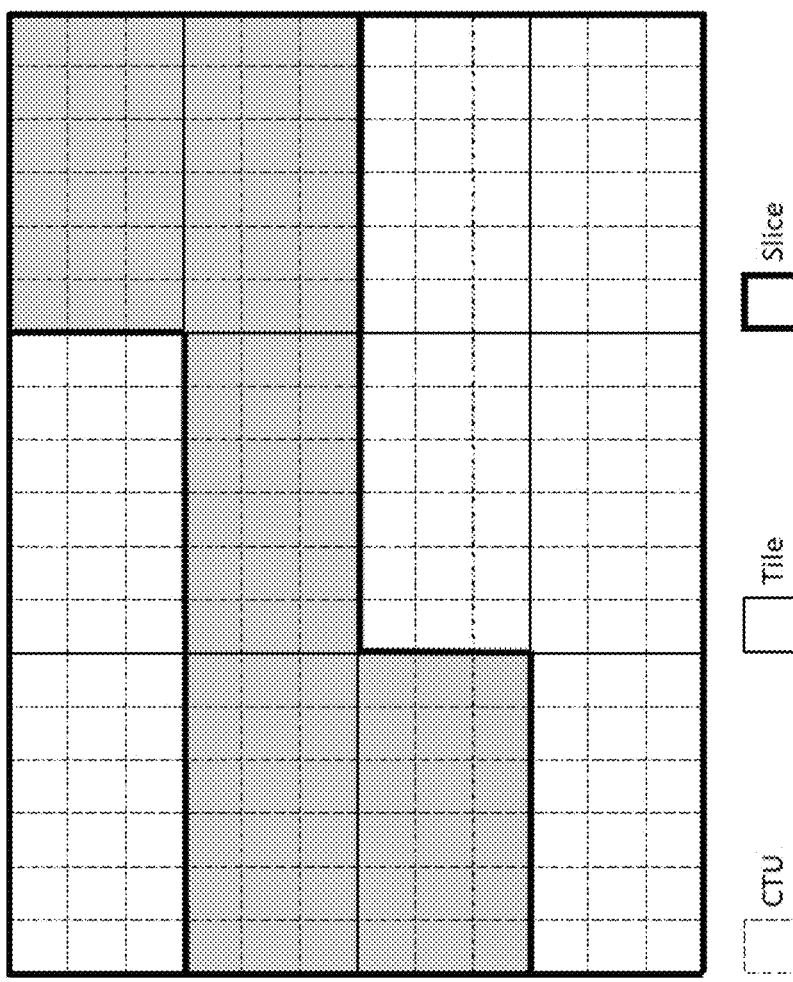
FIG. 5 shows an example of a picture with 18 by 12 luma CTUs that is partitioned into 12 tiles and 3 raster-scan slices.

FIG. 5 shows an example of raster-scan slice partitioning of a picture, where the picture is divided into 12 tiles and 3 raster-scan slices.

Figure 6:
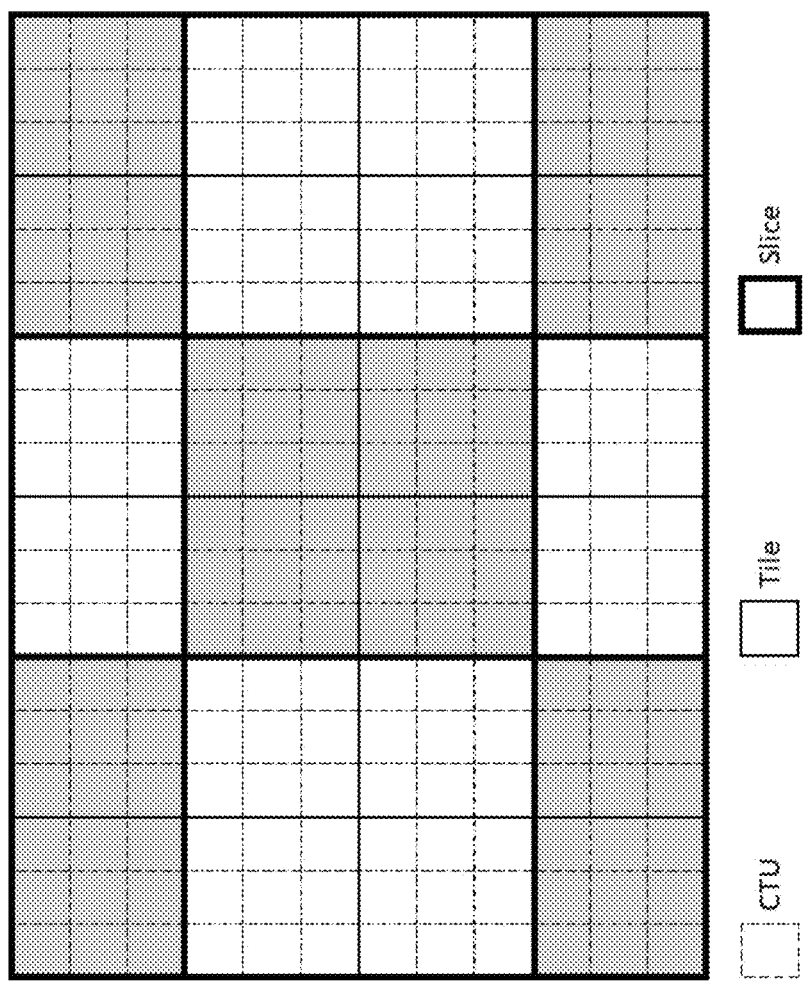
FIG. 6 shows an example of a picture with 18 by 12 luma CTUs that is partitioned into 24 tiles and 9 rectangular slices.

FIG. 6 shows an example of rectangular slice partitioning of a picture, where the picture is divided into 24 tiles (6 tile columns and 4 tile rows) and 9 rectangular slices.

Figure 7:
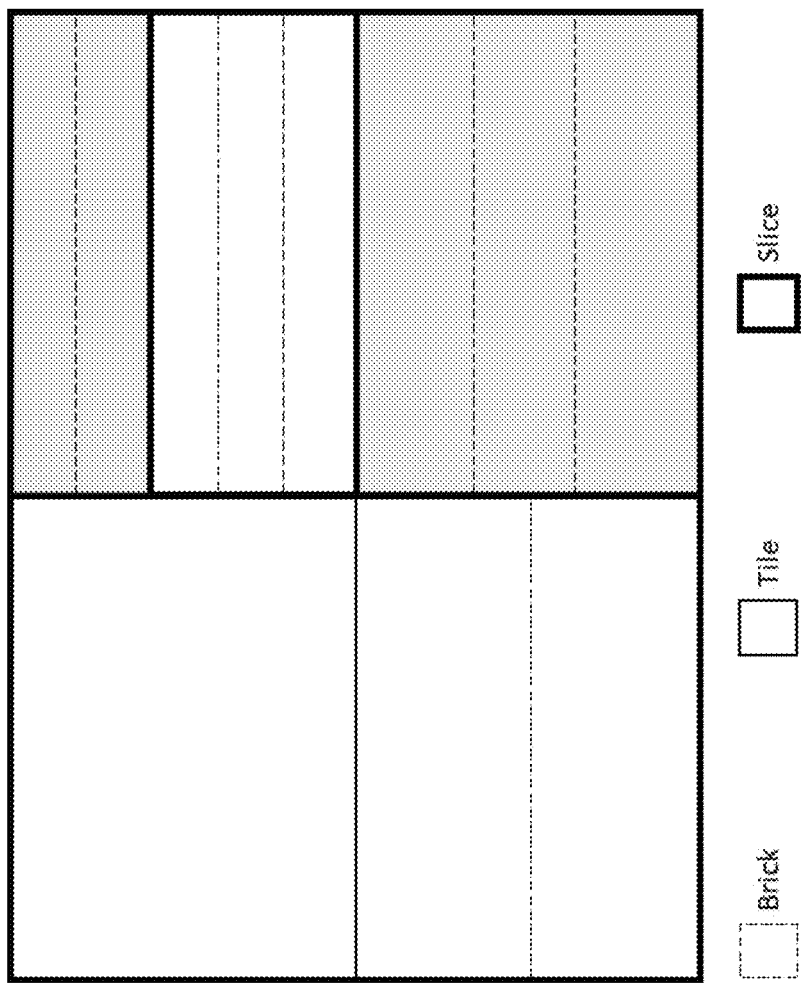
FIG. 7 shows an example of a picture that is partitioned into 4 tiles, 11 bricks, and 4 rectangular slices.

FIG. 7 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

Figure 8:
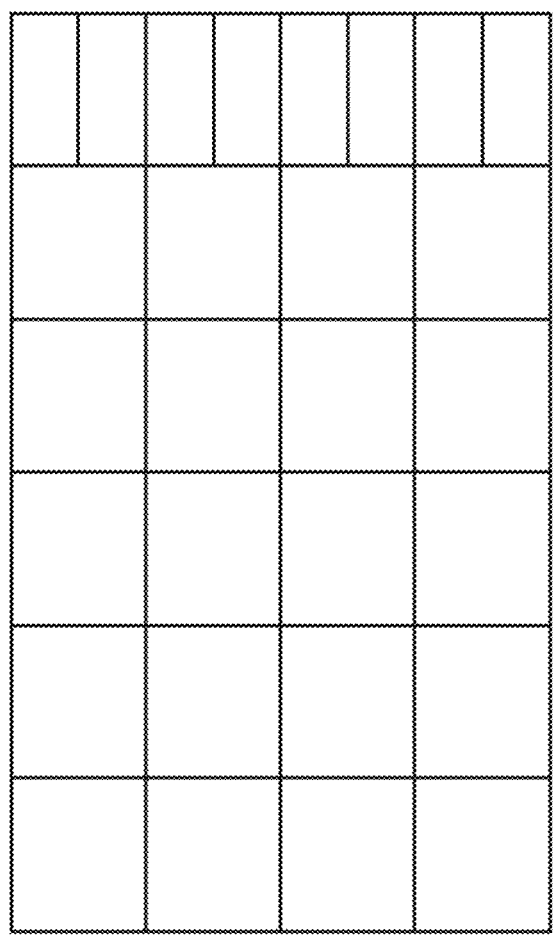
FIG. 8 shows an example of a picture with 28 subpictures.

FIG. 8 shows an example of subpicture partitioning of a picture, where a picture is partitioned into 28 subpictures of varying dimensions.

When a picture is coded using three separate colour planes (separate_colour_plane_flag is equal to 1), a slice contains only CTUs of one colour component being identified by the corresponding value of colour_plane_id, and each colour component array of a picture consists of slices having the same colour_plane_id value. Coded slices with different values of colour_plane_id within a picture may be interleaved with each other under the constraint that for each value of colour_plane_id, the coded slice NAL units with that value of colour_plane_id shall be in the order of increasing CTU address in brick scan order for the first CTU of each coded slice NAL unit.

When separate_colour_plane_flag is equal to 0, each CTU of a picture is contained in exactly one slice. When separate colour_plane_flag is equal to 1, each CTU of a colour component is contained in exactly one slice (e.g., information for each CTU of a picture is present in exactly three slices and these three slices have different values of colour_plane_id).

2.4. Wavfront with 1-CTU Delay

In VVC, one CTU delay wavefront (WPP) parallel processing instead of two CTU delay as in HEVC design is employed. The WPP processing is capable of a number of parallel processing with limited coding loss but two CTU delay could hamper the parallel processing capability. Because the target resolution is getting larger and number of CPUs is increasing, it is asserted that more parallel processing capability by leveraging the proposed one CTU delay is beneficial to reduce coding latency and it would fully utilize CTU power.

3. Example Problems in Existing Implementations

DMVR and BIO do not involve the original signal during refining the motion vectors, which may result in coding blocks with inaccurate motion information. Also, DMVR and BIO sometimes employ the fractional motion vectors after the motion refinements while screen videos usually have integer motion vectors, which makes the current motion information more inaccurate and make the coding performance worse.

(1) Current palette is constructed with prediction from the previous coded one. It is re-initialized before decoding a new CTU row or a new tile only when entropy_coding_sync_enabled_flag is equal to 1. However, in real applications, parallel encoder is preferred wherein different CTU rows may be pre-coded without referring to information of other CTU rows.

(2) The way to handle predictor palette updating process is fixed. That is, entries inherited from a previous predictor palette and new entries in current palette are inserted in order. If the number of entries is still smaller than the size of predictor palette, the entries which are not inherited from a previous predictor palette are further added. Such a design doesn't consider the importance of different entries in current and previous predictor palette.

(3) The size of the predictor palette is fixed and after decoding a block, it has to be updated to fill in all entries which may be sub-optimal since some of them may be never referenced.

(4) The size of current palette is fixed regardless of color components such as less chroma samples may be used compared to luma.

4. Example Techniques and Embodiments

The detailed embodiments described below should be considered as examples to explain general concepts. These embodiments should not be interpreted narrowly way. Furthermore, these embodiments can be combined in any manner.

The methods described below may be also applicable to other decoder motion information derivation technologies in addition to the DMVR and BIO mentioned below.

Regrading Predictor Palette

1. It is proposed to reset or re-initialize the predictor Palette (e.g., entries, and/or size of predictor palette) before decoding first block in a new video unit.
   a. Alternatively, the predictor Palette (e.g., entries, and/or size of predictor palette) may be reset or re-initialized after decoding a last block in the video unit.
   b. In one example, the video unit is a sub-region of a CTU (e.g., VPDU)/CTU/CTB/multiple CTUs/multiple CUs/CTU row/tile/brick/sub-picture/view, etc. al.
      i. Alternatively, furthermore, the above method is invoked even wavefront is disabled (e.g., entropy_coding_sync_enabled_flag is equal to 0).
   c. In one example, the video unit is a chroma CTU row.
      i. Alternatively, furthermore, the predictor Palette may be reset or re-initialized before decoding the first chroma CTB in a new chroma CTU row.
      ii. Alternatively, furthermore, the above method is invoked when dual tree is applied and current partition tree is the chroma coding tree.
   d. In one example, the size of the predictor palette (e.g., PredictorPaletteSize in specification) is reset to 0.
   e. In one example, the size of the predictor palette (e.g., PredictorPaletteSize in specification) is reset to the number of entries in the sequence palette predictor initializer (e.g., sps_num_palette_predictor_initializer_minus1 plus 1) or maximum number of entries allowed in a predictor palette (e.g., PaletteMaxPredictorSize).
   f. The initialization of predictor palette (e.g., PredictorPaletteEntries) before encoding/decoding a new sequence/picture may be utilized to initialize the predictor palette before encoding/decoding the new video unit.
   g. In one example, when entropy_coding_sync_enabled_flag is equal to 1, the predictor palette after encoding/decoding the upper CTB/CTU may be utilized to initialize the predictor palette before encoding/decoding the current CTB/CTU.
2. It is proposed to disable updating of the predictor palette after encoding/decoding a certain palette coded block.
   a. In one example, whether to update the predictor palette may depend on the decoded information of current block.
      i. In one example, whether to update the predictor palette may depend on the block dimension of current block.
         1. In one example, if current block's width is no greater than a first threshold (denoted by T1) and current block's height is no greater than a second threshold (denoted by T2), the updating process is disabled.
         2. In one example, if current block's width times block's height is no greater than a first threshold (denoted by T1), the updating process is disabled.
         3. In one example, if current block's width is no smaller than a first threshold (denoted by T1) and current block's height is no smaller than a second threshold (denoted by T2), the updating process is disabled.
         4. In one example, if current block's width times block's height is no smaller than a first threshold (denoted by T1), the updating process is disabled.
         5. In above examples, T1/T2 may be pre-defined or signaled.
            a) In one example, T1/T2 may be set to 4, 16 or 1024.
            b) In one example, T1/T2 may be dependent on color components.
3. A shared predictor palette may be defined wherein for all CUs/PUs under a shared region may use the same predictor palette.
   a. In one example, the shared region may be defined for a M×N region (e.g., a 16×4 or 4×16 region) with TT splitting.
   b. In one example, the shared region may be defined for a M×N region (e.g., an 8×4 or 4×8 region) with BT splitting.
   c. In one example, the shared region may be defined for a M×N region (e.g., an 8×8 region) with QT splitting.
   d. Alternatively, furthermore, the shared predictor palette may be constructed once before encoding/decoding all blocks within the shared region.
   e. In one example, indications of predicted entries in the predictor palette (e.g., palette_predictor_run) may be signaled together with the first palette coded block within the shared region.
      i. Alternatively, furthermore, the signaling of indications of predicted entries in the predictor palette (e.g., palette_predictor_run) may be skipped for remaining coded blocks within the shared region.

f. Alternatively, furthermore, after decoding/encoding a block within the shared region, the updating of predictor palette may be always skipped.
4. A counter may be maintained for each entry of predictor palette to indicate how often it is been used.
   a. In one example, the counter may be set to a constant, K, for each new entry added to the predictor palette.
      i. In one example, K may be set to 0.
   b. In one example, when an entry is marked as being reused when encoding/decoding a palette block, the corresponding counter may be increased by a constant N.
      i. In one example, N may be set to 1.
5. Instead of using fixed size of the predictor palette, it is proposed to adaptively change the size of the predictor palette.
   a. In one example, it may be changed from a video unit (block/CU/CTU/tile/brick/subpicture) to another video unit.
   b. In one example, the size of the predictor palette may be updated according to the size of current palette.
      i. In one example, the size of the predictor palette may be set to the size of current palette after decoding/encoding current block.
      ii. In one example, the size of the predictor palette may be set to the size of current palette after decoding/encoding current block minus or plus an integer value, denoted by K.
         1. In one example, K may be signaled/derived on the fly.
   c. In one example, the size of predictor palette may depend on the block size. Let S be the pre-defined size of predictor palette for a palette-coded block.
      i. In one example, a palette-coded block with a size smaller than or equal to T may use a predictor palette with a size smaller than S.
         1. In one example, the first K entries (K<=S) in the palette predictor may be used.
         2. In one example, a sub sampled version of the palette predictor may be used.
      ii. In one example, a palette-coded block with size larger than or equal to T may use a predictor palette with a size equal to S.
      iii. In the above examples, K and/or T are integer numbers and may be based on
         1. Video contents (e.g. screen contents or natural contents)
         2. A message signaled in the DPS/SPS/VPS/PPS/APS/picture header/slice header/tile group header/Largest coding unit (LCU)/Coding unit (CU)/LCU row/group of LCUs/TU/PU block/Video coding unit
         3. Position of CU/PU/TU/block/Video coding unit
         4. Indication of the color format (such as 4:2:0, 4:4:4, RGB or YUV)
         5. Coding tree structure (such as dual tree or single tree)
         6. Slice/tile group type and/or picture type
         7. Color component
         8. Temporal layer ID
         9. Profiles/Levels/Tiers of a standard
   d. In one example, after encoding/decoding a palette block, the predictor palette may be tailored according to the counters of entries.
      i. In one example, an entry with counter smaller than a threshold T may be discarded.
      ii. In one example, entries with smallest counter values may be discarded until the size of the predictor palette is smaller than a threshold T.
   e. Alternatively, furthermore, after decoding/encoding a palette coded block, the predictor palette may be updated only based on the current palette.
      i. Alternatively, furthermore, after decoding/encoding a palette coded block, the predictor palette may be updated to be the current palette.
6. Entries of current palette and/predictor palette before encoding/decoding current block may be re-ordered/modified before being used to update the predictor palette.
   a. In one example, reordering may be applied according to the decoded information/reconstruction of current sample.
   b. In one example, reordering may be applied according to the counter values of the entries.
   c. Alternatively, furthermore, how many times that a sample/pixel (in the current palette and/or outside the current palette) occurs may be countered.
      i. Alternatively, furthermore, the sample/pixel with a larger counter (e.g., occurring more frequently) may be put before another one with smaller counter.
7. Information of escaped samples may be utilized to update the predictor palette.
   a. Alternatively, furthermore, updating the predictor palette with escaped information may be conditionally invoked.
      i. In one example, when the predictor palette is not full after inserting the current palette, the escaped sample/pixel information may be added to the predictor palette.
8. Updating/initialization/resetting the predictor palette may depend on the color component.
   a. In one example, the rule to determine whether to update the predictor palette may depend on the color components, such as luma or chroma.
9. A set of multiple predictor palettes may be maintained and/or updated.
   a. In one example, one predictor palette may have information for one or all color components.
   b. In one example, one predictor palette may have information for two color components (e.g., Cb and Cr).
   c. In one example, at least one global palette and at least one local palette may be maintained.
      i. In one example, a predictor palette may be updated according to the global palette and a local palette.
   d. In one example, palettes associated with the last K palette coded blocks (in encoding/decoding order) may be maintained.
   e. In one example, palette for luma and chroma components may be predicted from different predictor palettes, e.g., with different indices to the set of multiple predictor palettes.
   f. Alternatively, furthermore, bullet 1 may be applied for the set of predictor palettes.
   g. Alternatively, furthermore, an index/indices of predictor palette in the set of predictor palettes may be signaled for a CU/PU/CTU/CTB/a sub-region of a CTU or CTB.

Regarding Palette/Predictor Palette Sizes
10. Size of palette may be changed from one video unit to another one.

a. In one example, it may be changed from a video unit (block/CU/CTU/tile/brick/subpicture) to another video unit.
b. In one example, it may be dependent on the decoded information of current block and/or neighboring (adjacent or non-adjacent) blocks.
11. Size of palette and/or predictor palette may be dependent on block dimension and/or quantization parameters.
12. Sizes of (or number of entries in a) Palette and/or predictor palette may be different for different color components.
   a. In one example, the indications of sizes of Palette and/or predictor palette for luma and chroma components may be explicitly or implicitly signaled.
   b. In one example, the indications of sizes of Palette and/or predictor palette for each color component may be explicitly or implicitly signaled.
   c. In one example, whether to signal indications of multiple sizes may depend on the usage of dual tree and/or slice/picture types.

Signaling of Palette
13. A conformance bitstream shall satisfy that the number of directly signaled entries for current block (e.g., num_signaled_palette_entries) shall be within [0, palette_max_size−NumPredictedPaletteEntries], a closed range that includes 0 and palette_max_size−NumPredictedPaletteEntries.
   a. How to binarize num_signaled_palette entries may depend on the allowed range.
      i. Truncated binarize coding may be utilized instead of EG-0$^{th}$.
   b. How to binarize num_signaled_palette entries may depend on decoded information (e.g., block dimension).

Regarding Wavefront with 1-CTU
14. It is proposed to re-initialize the predictor palette (e.g., entries and/or size) when ending the parsing of the CTU syntax (e.g., in VVC clause 7.3.8.2), entropy_coding_sync_enabled_flag is equal to 1, and either current CTB is the first one in a new CTU row or current CTB is not in the same brick as its preivouse CTB.
   a. Alternatively, furthermore, PredictorPaletteSizeWpp and PredictorPaletteEntriesWpp are maintained to record the updated size and entries of the predictor palette after finishing encoding/decoding the above CTU.
      i. Alternatively, furthermore, PredictorPaletteSizeWpp and PredictorPaletteEntriesWpp may be utilized to encoding/decoding current block in the current CTU.
   b. In one example, when ending the parsing of the CTU syntax in clause 7.3.8.2, entropy_coding_sync_enabled_flag is equal to 1, and either CtbAddrInRs % PicWidthInCtbsY is equal to 0 or BrickId[CtbAddrInBs] is not equal to BrickId[CtbAddrRsToBs[CtbAddrInRs−1]], the storage process for context variables as specified in clause 9.3.2.3 is invoked with TableStateIdx0Wpp, TableStateIdx1Wpp, and TableMpsValWpp and PredictorPaletteSizeWpp and PredictorPaletteEntriesWpp when palette_mode_enabled_flag is equal to 1 as outputs.

General
15. Whether and/or how apply the above methods may be based on:
   a. Video contents (e.g. screen contents or natural contents)
   b. A message signaled in the DPS/SPS/VPS/PPS/APS/picture header/slice header/tile group header/Largest coding unit (LCU)/Coding unit (CU)/LCU row/group of LCUs/TU/PU block/Video coding unit
   c. Position of CU/PU/TU/block/Video coding unit
   d. Decoded information of current block and/or its neighboring blocks
      i. Block dimension/Block shape of current block and/or its neighboring blocks
   e. Indication of the color format (such as 4:2:0, 4:4:4, RGB or YUV)
   f. Coding tree structure (such as dual tree or single tree)
   g. Slice/tile group type and/or picture type
   h. Color component (e.g. may be only applied on luma component and/or chroma component)
   i. Temporal layer ID
   j. Profiles/Levels/Tiers of a standard 5. Additional Embodiments In the following embodiments, the newly added texts are shown in bold and underline italicised text. Any deleted texts are marked by [[ ]].

5.1. Embodiment #1

9.3.1 General

This process is invoked when parsing syntax elements with descriptor ae(v) in clauses 7.3.8.1 through 7.3.8.12. Inputs to this process are a request for a value of a syntax element and values of prior parsed syntax elements. Output of this process is the value of the syntax element.
The initialization process as specified in clause 9.3.2 is invoked when starting the parsing of one or more of the following:
1. The slice segment data syntax specified in clause 7.3.8.1,
2. The CTU syntax specified in clause 7.3.8.2 and the CTU is the first CTU in a *__brick__* [[tile]],
3. The CTU syntax specified in clause 7.3.8.2, [[entropy_coding_sync_enabled_flag is equal to 1 and]] the associated luma CTB is the first luma CTB in a CTU row of a *__brick__* [[tile]].
The parsing of syntax elements proceeds as follows:
When cabac_bypass_alignment_enabled_flag is equal to 1, the request for a value of a syntax element is for either the syntax elements coeff_abs_level_remaining[ ] or coeff_sign_flag[ ] and escapeDataPresent is equal to 1, the alignment process prior to aligned bypass decoding as specified in clause 9.3.4.3.6 is invoked.
For each requested value of a syntax element a binarization is derived as specified in clause 9.3.3.
The binarization for the syntax element and the sequence of parsed bins determines the decoding process flow as described in clause 9.3.4.
In case the request for a value of a syntax element is processed for the syntax element pcm_flag and the decoded value of pcm_flag is equal to 1, the decoding engine is initialized after the decoding of any pcm_alignment_zero_bit and all pcm_sample_luma and pcm_sample_chroma data as specified in clause 9.3.2.6.

The storage process for context variables is applied as follows:
   When ending the parsing of the CTU syntax in clause 7.3.8.2, entropy_coding_sync_enabled_flag is equal to 1 and either CtbAddrInRs % PicWidthInCtbsY is equal to 1 or both CtbAddrInRs is greater than 1 and TileId[CtbAddrInTs] is not equal to TileId[CtbAddrRsToTs[CtbAddrInRs−2]], the storage process for context variables, Rice parameter initialization states, and palette predictor variables as specified in clause 9.3.2.4 is invoked with TableStateIdxWpp, TableMpsValWpp, TableStatCoeffWpp when persistent_rice_adaptation_enabled_flag is equal to 1, and PredictorPaletteSizeWpp and PredictorPaletteEntriesWpp when palette_mode_enabled_flag is equal to 1 as outputs.
   When ending the parsing of the general slice segment data syntax in clause 7.3.8.1, dependent_slice_segments_enabled_flag is equal to 1 and end_of_slice_segment_flag is equal to 1, the storage process for context variables, Rice parameter initialization states, and palette predictor variables as specified in clause 9.3.2.4 is invoked with TableStateIdxDs, TableMpsValDs, TableStatCoeffDs when persistent_rice_adaptation_enabled_flag is equal to 1, and PredictorPaletteSizeDs and PredictorPaletteEntriesDs when palette_mode_enabled_flag is equal to 1 as outputs.

5.2. Embodiment #2

9.3 CABAC Parsing Process for Slice Data

9.3.1 General

Inputs to this process are a request for a value of a syntax element and values of prior parsed syntax elements. Output of this process is the value of the syntax element.
The initialization process as specified in clause 9.3.2 is invoked when starting the parsing of the CTU syntax specified in clause 7.3.8.2 and one or more of the following conditions are true:
   The CTU is the first CTU in a brick.
   The value of entropy_coding_sync_enabled_flag is equal to 1 and the CTU is the first CTU in a CTU row of a brick.
The parsing of syntax elements proceeds as follows:
For each requested value of a syntax element a binarization is derived as specified in subclause 9.3.3.
The binarization for the syntax element and the sequence of parsed bins determines the decoding process flow as described in subclause 9.3.4.
The storage process for context variables is applied as follows:
   When ending the parsing of the CTU syntax in clause 7.3.8.2, entropy_coding_sync_enabled_flag is equal to 1, and either CtbAddrInRs % PicWidthInCtbsY is equal to 0 or BrickId[CtbAddriInBs] is not equal to BrickId[CtbAddrRsToBs[CtbAddrInRs−1]], the storage process for context variables as specified in clause 9.3.2.3 is invoked with TableStateIdx0Wpp, TableStateIdx1Wpp, and TableMpsValWpp *and PredictorPaletteSizeWpp and PredictorPaletteEntriesWpp when palette_mode_enabled_flag is equal to 1* as outputs.

9.3.2 Initialization Process

9.3.2.1 General

Outputs of this process are initialized CABAC internal variables.
The context variables of the arithmetic decoding engine are initialized as follows:
   If the CTU is the first CTU in a brick, the initialization process for context variables is invoked as specified in clause 9.3.2.2 and the variable PredictorPaletteSize[0/1/2] is initialized to 0.
   Otherwise, if entropy_coding_sync_enabled_flag is equal to 1 and either CtbAddrInRs % PicWidthInCtbsY is equal to 0 or BrickId[CtbAddrInBs] is not equal to BrickId[CtbAddrRsToBs[CtbAddrInRs−1]], the following zapplies:
   The location (xNbT, yNbT) of the top-left luma sample of the spatial neighbouring block T (FIG. 9-2) is derived using the location (x0, y0) of the top-left luma sample of the current CTB as follows:

$$(xNbT, yNbT) = (x0, y0 - CtbSizeY) \qquad (9-3)$$

The derivation process for neighbouring block availability as specified in clause 6.4.4 is invoked with the location (xCurr, yCurr) set equal to (x0, y0), the neighbouring location (xNbY, yNbY) set equal to (xNbT, yNbT), checkPredModeY set equal to FALSE, and cIdx set equal to 0 as inputs, and the output is assigned to availableFlagT.
   The synchronization process for context variables is invoked as follows:
   If availableFlagT is equal to 1, the synchronization process for context variables as specified in clause 9.3.2.4 is invoked with TableStateIdx0Wpp, TableStateIdx1Wpp, TableMpsValWpp as inputs and the variable PredictorPaletteSize is initialized to 0.
   Otherwise, the initialization process for context variables is invoked as specified in clause 9.3.2.2 and the variable PredictorPaletteSize is initialized to 0.
   Otherwise, the initialization process for context variables is invoked as specified in clause 9.3.2.2 and the variable PredictorPaletteSize is initialized to 0.
The decoding engine registers ivlCurrRange and ivlOffset both in 16 bit register precision are initialized by invoking the initialization process for the arithmetic decoding engine as specified in subclause 9.3.2.5.

9.3.2.3 Storage Process for Context Variables

Inputs to this process are:
   The CABAC context variables indexed by ctxTable and ctxIdx.
Outputs of this process are:
   The variables tableStateSync0, tableStateSync1, and tableMPSSync containing the values of the variables pStateIdx0, pStateIdx1, and valMps used in the initialization process of context variables that are assigned to all syntax elements in clauses 7.3.8.1 through 7.3.8.11, except end_of_brick_one_bit, and end_of_subset_one_bit.

*PredictorPaletteSizeWpp and PredictorPaletteEntriesWpp when palette_mode_enabled_flag is equal to 1*

For each context variable, the corresponding entries pStateIdx0, pStateIdx1, and valMps of tables tableState- Sync0, tableStateSync1, and tableMPSSync are initialized to the corresponding pStateIdx0, pStateIdx1, and valMps.

*PredictorPaletteSizeWpp is set to 0,*

*and PredictorPaletteEntriesWpp is set to empty.*

Alternatively, the following may apply:

*PredictorPaletteSizeWpp and PredictorPaletteEntriesWpp are set to the corresponding PredictorPaletteSize and entries of the predictor palette, respectively.*

5.3. Embodiment #3

| slice_data( ) { | Descriptor |
|---|---|
|   for( i = 0; i < NumBricksInCurrSlice; i++) { | |
|     CtbAddrInBs = FirstCtbAddrBs[ SliceBrickIdx[ i ] ] | |
|     for( j = 0; j < NumCtusInBrick[ SliceBrickIdx[ i ] ]; j++, CtbAddrInBs++) { | |
|       if( ( j % BrickWidth[ SliceBrickIdx[ i ] ] ) = = 0) { | |
|         NumHmvpCand = 0 | |
|         NumHmvpIbcCand = 0 | |
|         *PredictorPaletteSize[0] = 0* | |
|         *PredictorPaletteSize[1] = 0* | |
|         *PredictorPaletteSize[2] = 0* | |
|         ResetIbcBuf =1 | |
|       } | |
|       CtbAddrInRs = CtbAddrBsToRs[ CtbAddrInBs ] | |
|       coding_tree_unit( ) | |
|       if( entropy_coding_sync_enabled_flag && | |
|         ( j < NumCtusInBrick[ SliceBrickIdx[ i ] ] - 1) && | |
|         ( ( j + 1 ) % BrickWidth[ SliceBrickIdx[ i ] ] = = 0 ) ) { | |
|         end_of_subset_one_bit /* equal to 1 */ | ae(v) |
|         byte_alignment( ) | |
|       } | |
|     } | |
|     end_of_brick_one_bit /* equal to 1 */ | ae(v) |
|     if( i < NumBricksInCurrSlice - 1) | |
|       byte_alignment( ) | |
|   } | |
| } | |

Alternatively, *PredictorPaletteSize* in above table may be set to another integer value, such as fixed value, or predictor palette size.

6. Example Implementations of the Disclosed Technology

Figure 9:
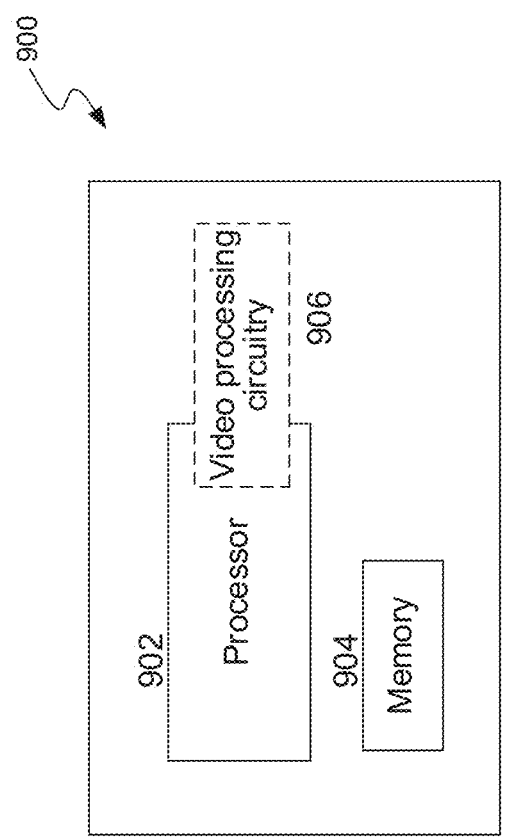
FIG. 9 is a block diagram of an example of a hardware platform for implementing a visual media decoding or a visual media encoding technique described in the present document.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods described in the present document. The memory (memories) 904 may be used for storing data and code used for implementing the methods and techniques described herein. The video processing hardware 906 may be used to implement, in hardware circuitry, some techniques described in the present document, and may be partly or completely be a part of the processors 902 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 10:
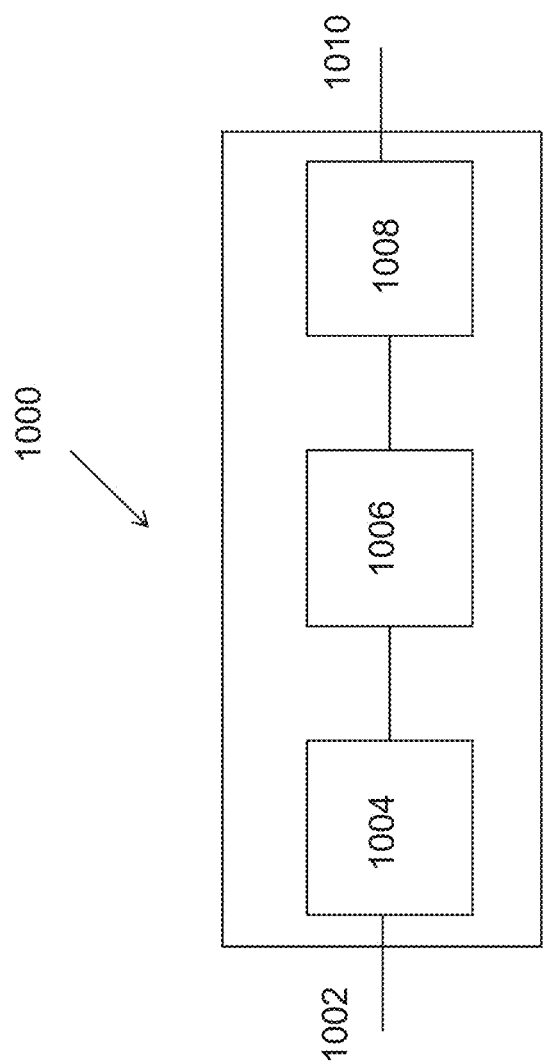
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 11:
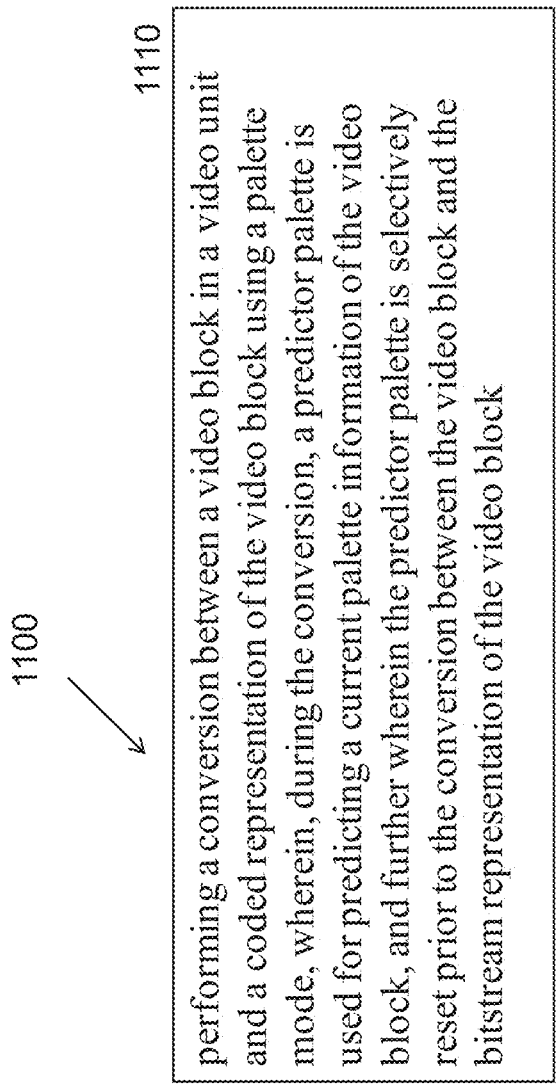
FIG. 11 shows a flowchart of an example method for video coding.

FIG. 11 is a flowchart for an example method 1100 of video processing. The method 1100 includes, at 1110, performing a conversion between a video block in a video unit and a coded representation of the video block using a palette mode, wherein, during the conversion, a predictor palette is used for predicting a current palette information of the video block, and further wherein the predictor palette is selectively reset prior to the conversion between the video block and the bitstream representation of the video block.

Some embodiments may be described using the following clause-based format.

1. A method of video processing, comprising:
performing a conversion between a video block in a video unit and a coded representation of the video block using a palette mode, wherein, during the conversion, a predictor palette is used for predicting a current palette information of the video block, and further wherein the predictor palette is selectively reset prior to the conversion between the video block and the bitstream representation of the video block.

2. The method of clause 1, wherein the video unit includes one of: one or more coding tree units, one or more coding tree blocks, a sub-region of a coding tree unit or a coding tree block, or a coding tree block row/tile/brick/sub-picture/view of a coding tree unit.

3. The method of any of clauses 1-2, wherein delay wavefront parallel processing is disabled during the conversion.

4. The method of clause 3, wherein an entropy_coding_sync_enabled_flag is set equal to 0.

5. The method of clause 1, wherein the video unit is a row of a chroma coding tree unit.

6. The method of clause 5, wherein the predictor palette is reset before decoding a first chroma coding tree block (CTB) in a new chroma CTU row.

7. The method of clause 5, wherein the predictor palette is reset when a dual coding tree is applied and a current partition of the dual coding tree is the chroma coding tree unit.

8. The method of clause 1, wherein a size of the predictor palette is reset to zero.

9. The method of clause 1, wherein a size of the predictor palette is reset to a number of entries in a sequence palette predictor initializer or a maximum number of allowable entries.

10. The method of clause 9, wherein the sequence palette predictor initializer is used to initialize the palette predictor prior to application on the video unit.

11. The method of clause 1, wherein when an entropy_coding_sync_enabled_flag is set equal to 1, the palette predictor applied on a previous video block is re-initialized prior to application on the video unit.

12. The method of clause 1, wherein updating the predictor palette is disabled based on a coded information associated with the video unit.

13. The method of clause 12, wherein the coded information includes a dimension of the video unit.

14. The method of clause 13, wherein updating the predictor palette is disabled based on the dimension of the video unit achieving one or more threshold conditions.

15. The method of clause 14, wherein the one or more threshold conditions are pre-defined.

16. The method of clause 14, wherein the one or more threshold conditions are explicitly or implicitly signaled in the coded representation of the video unit.

17. A method of video processing, comprising:
performing a conversion between a video block in a video unit and a coded representation of the video block using a palette mode, wherein, during the conversion, a predictor palette is used for predicting a current palette information of the video block, and further wherein the predictor palette is a shared predictor palette when multiple coding units of the video unit have a commonly shared region.

18. The method of clause 17, wherein the shared region is associated with any of: a TT splitting, a BT splitting, a QT splitting.

19. The method of clause 17, wherein the shared predictor palette is constructed prior to application on the multiple coding units.

20. The method of clause 17, wherein indications of usage of the shared predictor palette is explicitly or implicitly signaled in the coded representation in connection with a first palette coded unit of the shared region.

21. The method of clause 17, further comprising:
skipping updating of the shared predictor palette subsequent to application on a coded unit of the multiple coded units.

22. A method of video processing, comprising:
performing a conversion between a video block in a video unit and a coded representation of the video block using a palette mode, wherein, during the conversion, a predictor palette is used for predicting a current palette information of the video block, and further wherein a size of predictor palette is adaptively changed in accordance with one or more conditions.

23. The method of clause 22, wherein the one or more conditions are associated with at least: a size of the previous palette information, dimensions of the video unit, contents of the video unit, a color format of the video unit, a color component of the video unit, a coding tree structure of the video block, a relative position of the video block in the coded representation, a temporal layer ID of the video block, a slice/tile group type and/or picture type of the video block, or a profile/level/tier of the video block.

24. A method of video processing, comprising:
performing a conversion between a video block in a video unit and a coded representation of the video block using a palette mode, wherein, during the conversion, a predictor palette is used for predicting a current palette information of the video block, and further wherein the predictor palette is updated based on a size or a number of entries in the predictor palette.

25. The method of clause 24, wherein the size of the predictor palette is updated from a previous video block to the current video block.

26. The method of clause 24, wherein the size of the predictor palette is implicitly or explicitly signaled in the coded representation.

27. The method of clause 24, wherein the size of the predictor palette depends on one or more of: dimensions of the video block, quantization parameters of the video block, or one or more color components of the video block.

28. A method of video processing, comprising:
performing a conversion between a video block in a video unit and a coded representation of the video block using a palette mode, wherein, during the conversion, a predictor palette is used for predicting a current palette information of the video block, and further wherein entries of the predictor palette are re-ordered or modified.

29. The method of clause 28, wherein the entries of the predictor palette are re-ordered or modified when entropy_coding_sync_enabled_flag is equal to 1.

30. The method of clause 28, wherein the entries of the predictor palette are re-ordered or modified when an end of the coding tree unit syntax is encountered.

31. The method of clause 28, wherein the entries of the predictor palette are re-ordered or modified when a current CTB is a first one in a new CTU row or current CTB is not in a same brick as a previous CTB.

32. A method of video processing, comprising:
performing a conversion between a video block in a video unit and a coded representation of the video block using a palette mode, wherein, during the conversion, a predictor palette is used for predicting a current palette information of the video block, and further wherein a usage of the predictor palette is indicated by maintaining a counter that keep track of a number of times the predictor palette is used.

33. The method of any of the aforementioned clauses, wherein enabling or disabling the predictor palette is associated with at least one of: a size of the previous palette information, dimensions of the video block, contents of the video block, a color format of the video block, a color component of the video block, a coding tree structure of the video block, a relative position of the video block in the coded representation, a temporal layer ID of the video block, a slice/tile group type and/or picture type of the video block, or a profile/level/tier of the video block.

34. The method of any of the aforementioned clauses, wherein more than one predictor palette is used during the conversion.

35. A video decoding apparatus comprising a processor configured to implement a method recited in one or more of clauses 1 to 34.

36. A video encoding apparatus comprising a processor configured to implement a method recited in one or more of clauses 1 to 34.

37. A computer program product having computer code stored thereon, the code, when executed by a processor, causes the processor to implement a method recited in any of clauses 1 to 34.

38. A method, apparatus or system described in the present document.

Figure 12:
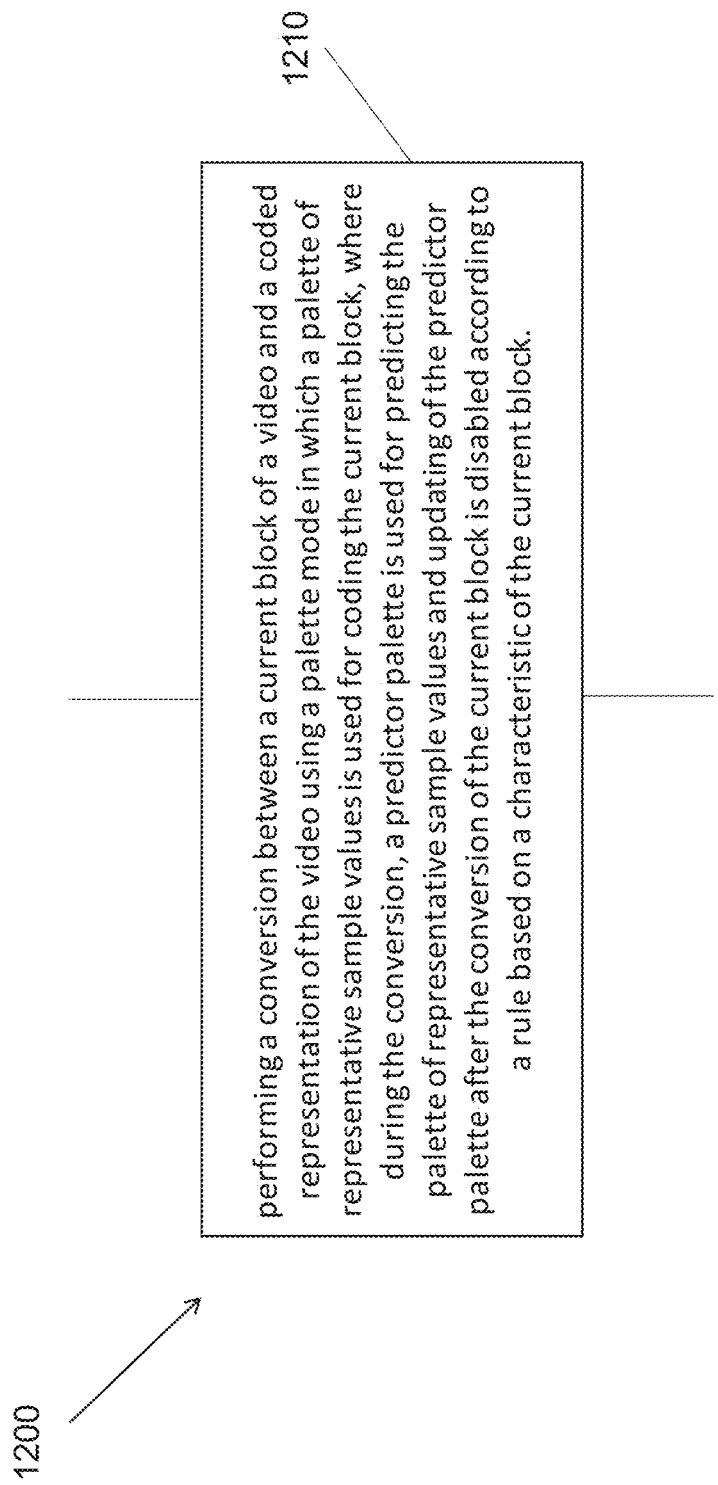
FIG. 12 is a flowchart representation of a method of video processing in accordance with the present technology.

FIG. 12 is a flowchart representation of a method 1200 of video processing in accordance with the present technology. The method 1200 includes, at operation 1210, performing a conversion between a current block of a video and a coded representation of the video using a palette mode in which a palette of representative sample values is used for coding the current block. During the conversion, a predictor palette is used for predicting the palette of representative sample values and updating of the predictor palette after the conversion of the current block is disabled according to a rule based on a characteristic of the current block.

In some embodiments, the characteristic of the current block comprises coded information associated with the current block. In some embodiments, the characteristic of the current block comprises a dimension of the current block. In some embodiments, the rule specifies that the updating of the predictor palette is disabled in case a width of the current block is smaller than or equal to a first threshold, and a height of the current block is smaller than or equal to a second threshold. In some embodiments, the rule specifies that the updating of the predictor palette is disabled in case a height of the current block is smaller than or equal to a first threshold. In some embodiments, the rule specifies that the updating of the predictor palette is disabled in case a width of the current block is greater than or equal to a first threshold, and a height of the current block is greater than or equal to a second threshold. In some embodiments, the rule specifies that the updating of the predictor palette is disabled in case a height of the current block is greater than or equal to a first threshold.

In some embodiments, the first threshold or the second threshold is predefined or signaled in the coded representation. In some embodiments, the first threshold is 4, 16, or 1024. In some embodiments, the second threshold is 4, 16, or 1024. In some embodiments, the first threshold or the second threshold is based on a color component of the current block.

FIG. 13 is a flowchart representation of a method 1300 of video processing in accordance with the present technology. The method 1300 includes, at operation 1310, performing a conversion between a current block of a video and a coded representation of the video using a palette mode in which a palette of representative sample values is used for coding the current block. During the conversion, a predictor palette is used for predicting the palette of representative sample values, and whether a change to the predictor palette is to be performed is determined according to a color component of the current block.

In some embodiments, the change to the predictor palette comprises updating, initialization, or resetting the predictor palette. In some embodiments, the color component comprises a luma or a chroma component. In some embodiments, the predictor palette comprises information corresponding to the color component of the current block. In some embodiments, the predictor palette comprises information corresponding to all color components of the current block. In some embodiments, the predictor palette comprises information corresponding to two chroma components of the current block.

Figure 14:
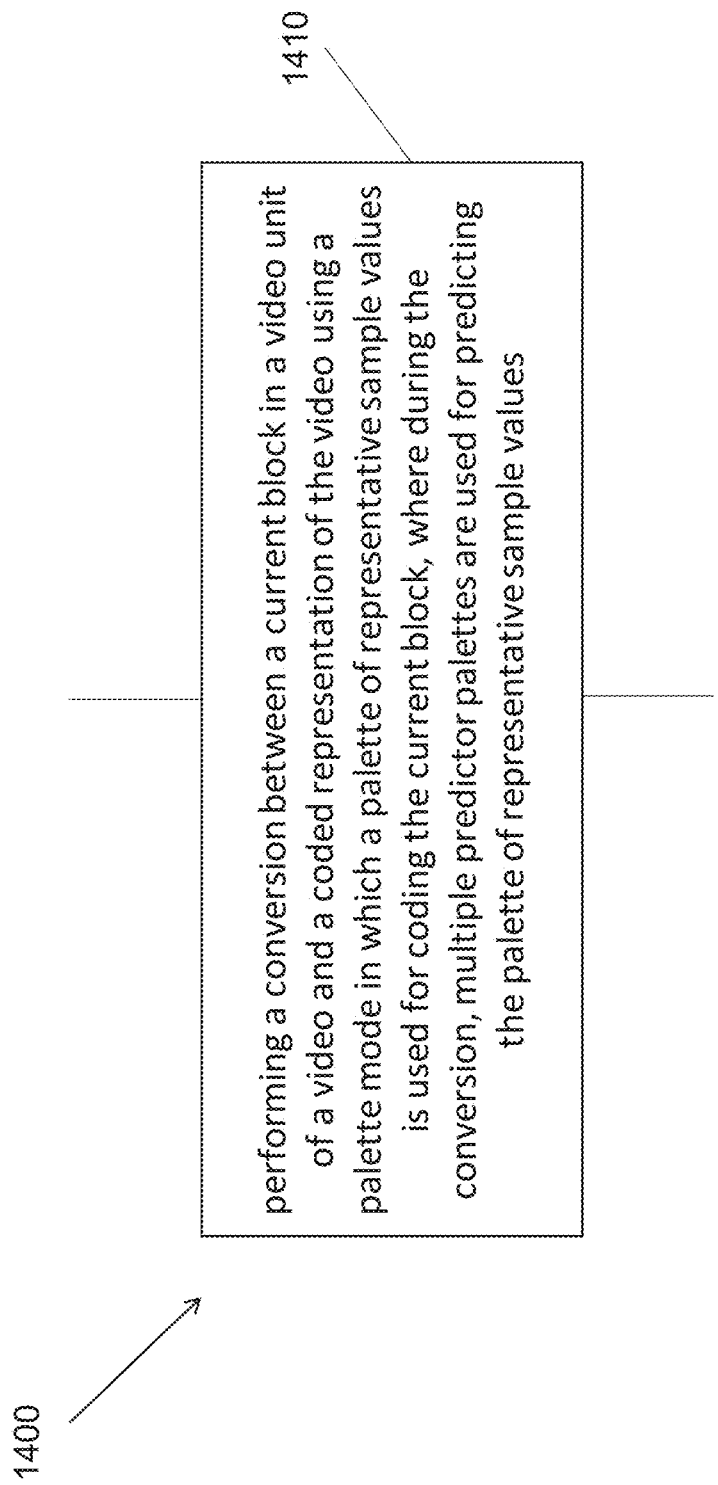
FIG. 14 is a flowchart representation of another method of video processing in accordance with the present technology.

FIG. 14 is a flowchart representation of a method 1400 of video processing in accordance with the present technology. The method 1400 includes, at operation 1410, performing a conversion between a current block in a video unit of a video and a coded representation of the video using a palette mode in which a palette of representative sample values is used for coding the current block. During the conversion, multiple predictor palettes are used for predicting the palette of representative sample values.

In some embodiments, a predictor palette of the current block is updated according to at least a global palette and a local palette. In some embodiments, the multiple predictor palettes are associated with K blocks in the video unit that have been coded using the palette mode. In some embodiments, palettes for different color components are determined according to different predictor palettes of the multiple predictor palettes. In some embodiments, the multiple predictor palettes are reset or re-initialized prior to a conversion of a first block in the video unit or after a conversion of a last block in a previously converted video unit. In some embodiments, an index of a predictor palette of the multiple predictor palettes is signaled in a coding unit, a prediction unit, a coding tree unit, a coding tree block, a sub-region of a coding tree unit, or a sub-region of a coding tree block in the coded representation.

FIG. 15 is a flowchart representation of a method 1500 of video processing in accordance with the present technology. The method 1500 includes, at operation 1510, performing a conversion between a current block in a video unit of a video and a coded representation of the video using a palette mode in which a palette of representative sample values is used for coding the current block. During the conversion, a predictor palette is used for predicting the palette of representative sample values. The predictor palette is reset or re-initialized prior to a conversion of a first block in the video unit or after a conversion of a last video block in a previous video unit according to a rule.

In some embodiments, the video unit comprises a subregion of a coding tree unit, a virtual pipeline data unit, one or more coding tree units, a coding tree block, one or more coding units, a coding tree unit row, a tile, a brick, a sub-picture, or a view of the video. In some embodiments, the rule specifies that resetting or re-initializing the predictor palette is applicable to the video unit regardless of whether wavefront parallel processing of multiple video units is enabled or not. In some embodiments, the video unit comprises a coding tree unit row corresponding to a chroma component. In some embodiments, the first block comprises a first coding tree block corresponding to the chroma component in the coding tree unit row. In some embodiments, the rule specifies that resetting or re-initializing the predictor palette is applicable to the video unit in case a dual tree partition is applied and a current partition tree is a coding tree corresponding to the chroma component. In some embodiments, a size of the predictor palette is reset or re-initialized to 0. In some embodiments, a size of the predictor palette is reset or re-initialized to a number of entries in a sequence palette predictor initializer or a maximum number of entries allowed in a predictor palette that is signaled in the coded representation.

In some embodiments, the predictor palette is further reset or re-initialized prior to converting a new video unit. In some embodiments, in case wavefront parallel processing of multiple video units is enabled, the predictor palette used for the conversion of a current coding tree block or a current coding tree unit is determined based on a coding tree block or a coding tree unit that has been converted.

Figure 16:
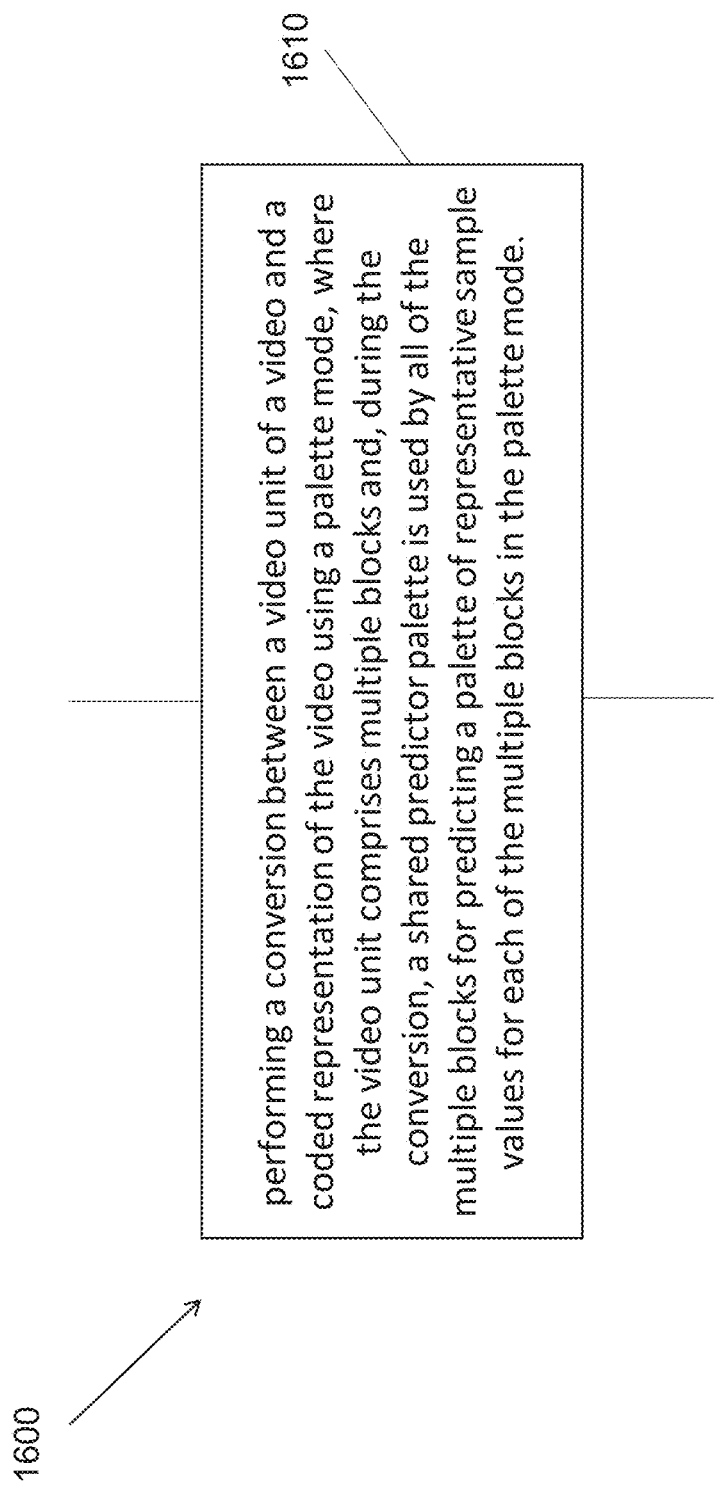
FIG. 16 is a flowchart representation of another method of video processing in accordance with the present technology.

FIG. 16 is a flowchart representation of a method 1600 of video processing in accordance with the present technology. The method 1600 includes, at operation 1610, performing a conversion between a video unit of a video and a coded representation of the video using a palette mode. The video unit comprises multiple blocks. During the conversion, a shared predictor palette is used by all of the multiple blocks for predicting a palette of representative sample values for each of the multiple blocks in the palette mode.

In some embodiments, a tertiary tree partitioning is applied to the video unit, and wherein the shared predictor palette is used for video unit that has a dimension of 16×4 or 4×16. In some embodiments, a binary tree portioning is applied to the video unit, and the shared predictor palette is used for video unit that has a dimension of 8×4 or 4×8. In some embodiments, a quad tree portioning is applied to the video unit, and the shared predictor palette is used for video unit that has a dimension of 8×8. In some embodiments, the shared predictor palette is constructed one prior to conversions of all the multiple blocks within the video unit.

In some embodiments, an indication of a predicted entry in the shared predictor palette is signaled in the coded representation with a first coded block of the multiple blocks in the region. In some embodiments, an indication of a predicted entry in the shared predictor palette is omitted in the coded representation for remaining of the multiple blocks in the region. In some embodiments, updating of the shared predictor palette is skipped after a conversion of one of the multiple blocks in the region.

FIG. 17 is a flowchart representation of a method 1700 of video processing in accordance with the present technology. The method 1700 includes, at operation 1710, performing a conversion between a current block of a video and a coded representation of the video using a palette mode in which a palette of representative sample values is used for coding the current block. During the conversion, a predictor palette is used for predicting the palette of representative sample values, and a counter is maintained for each entry of the predictor palette indicating how often the corresponding entry is used.

In some embodiments, the counter is set to K for a new entry to be added to the predictor palette, K being an integer. In some embodiments, K=0. In some embodiments, the counter is incremented by N every time the corresponding entry is reused during the conversion of the current block, N being a positive integer. In some embodiments, N=1.

In some embodiments, entries of the predictor palette are re-ordered according to a rule prior to the predictor palette being used for the conversion. In some embodiments, the rule specifies that the entries of the predictor palette are re-ordered according to coded information of a current sample. In some embodiments, the rule specifies that the entries of the predictor palette are re-ordered according to the counter for each corresponding entry of the entries in the predictor palette.

In some embodiments, a second counter is used to indicate a frequency of occurrence of a sample. In some embodiments, a first sample that has a higher frequency of occurrence is positioned prior to a second sample that has lower frequency of occurrence in the predictor palette. In some embodiments, the predictor palette is updated using escaped samples in the current block according to a rule. In some embodiments, the rule specifies that the predictor palette is updated using the escaped samples in case a condition is satisfied. In some embodiments, the condition is satisfied in case the predictor palette is not full after inserting a current block of the current block.

Figure 18:
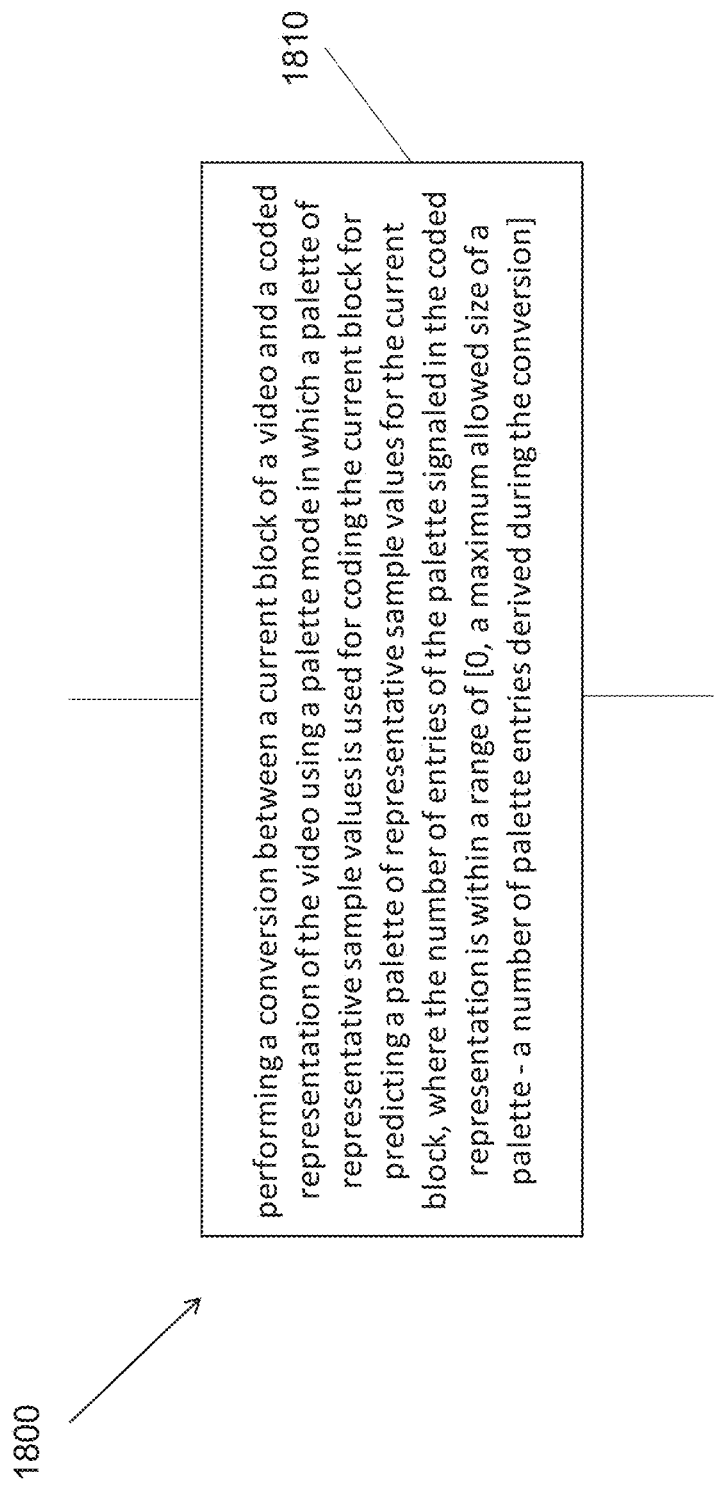
FIG. 18 is a flowchart representation of another method of video processing in accordance with the present technology.

FIG. 18 is a flowchart representation of a method 1800 of video processing in accordance with the present technology. The method 1800 includes, at operation 1810, performing a conversion between a current block of a video and a coded representation of the video using a palette mode in which a palette of representative sample values is used for coding the current block for predicting a palette of representative sample values for the current block. The number of entries of the palette signaled in the coded representation is within a range of [0, a maximum allowed size of a palette—a number of palette entries derived during the conversion], which is a closed range that includes 0 and a maximum allowed size of a palette—a number of palette entries derived during the conversion.

In some embodiments, the number of entries of the palette signaled in the coded representation is binarized based on the range. In some embodiments, the number of entries signaled in the coded representation is binarized using a truncated binarize coding process. In some embodiments, the number of entries signaled in the coded representation is binarized based on a characteristic of the current block. In some embodiments, the characteristic includes a dimension of the current block.

Figure 19:
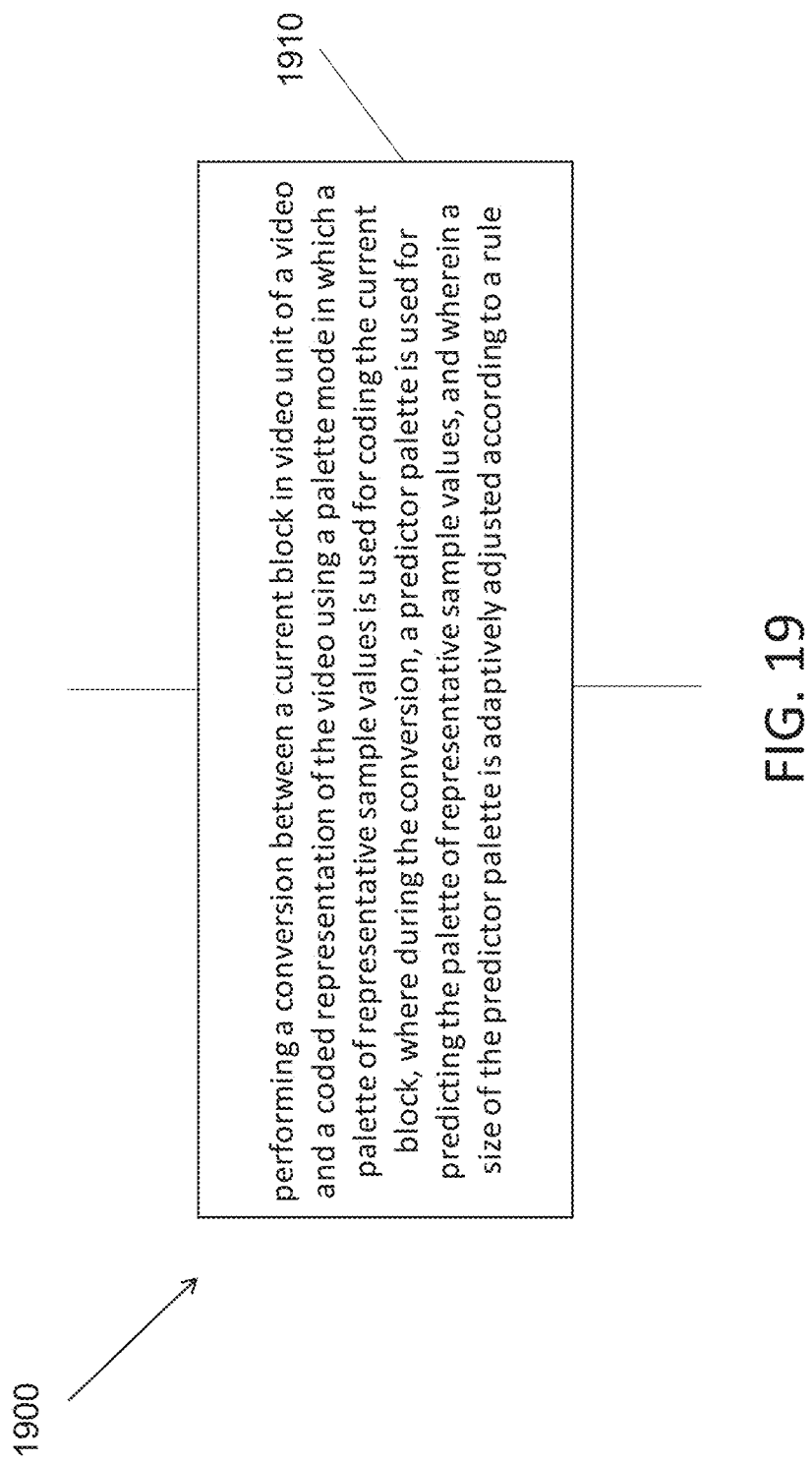
FIG. 19 is a flowchart representation of another method of video processing in accordance with the present technology.

FIG. 19 is a flowchart representation of a method 1900 of video processing in accordance with the present technology. The method 1900 includes, at operation 1910, performing a conversion between a current block in video unit of a video and a coded representation of the video using a palette mode in which a palette of representative sample values is used for coding the current block. During the conversion, a predictor palette is used for predicting the palette of representative sample values, and wherein a size of the predictor palette is adaptively adjusted according to a rule.

In some embodiments, the size of the predictor palette in a dual tree partition is different with that in a single tree partition. In some embodiments, the video unit comprises a block, a coding unit, a coding tree unit, a tile, a brick, or a subpicture. In some embodiments, the rule specifies that the predictor palette has a first size for the video unit and has a different second size for a conversion of a subsequent video unit. In some embodiments, the rule specifies that the size of the predictor palette is adjusted according to a size of a current palette for the conversion. In some embodiments, the size of the predictor palette is equal to the size of the current palette that is determined after the conversion of the current block. In some embodiments, the size of the predictor palette is equal to the size of the current palette that is determined after the conversion of the current block plus or minus an offset, wherein the offset is an integer. In some embodiments, the offset is signaled in the coded representation. In some embodiments, the offset is derived during the conversion.

In some embodiments, the rule specifies a pre-defined size of the predictor palette for the current block as S, and the rule further specifies that the size of the predictor palette is adjusted according to a size of the current block. In some embodiments, in case the size of the current block is smaller than or equal to T, the size of the predictor palette is adjusted to be smaller than the pre-defined size S, T and S being integers. In some embodiments, first K entries in the predicator palette are used for the conversion, where K is an integer and K≤S. In some embodiments, a sub-sampled predictor palette having a size smaller than the pre-defined size S is used for the conversion. In some embodiments, in case the size of the current block is greater than or equal to T, the size of the predictor palette is adjusted to be the pre-defined size S.

In some embodiments, K or T is determined based on a characteristic of the video. In some embodiments, the characteristic of the video comprises a content of the video. In some embodiments, the characteristic of the video comprises information signaled in a decoder parameter set, a slice parameter set, a video parameter set, a picture parameter set, an adaptation parameter set, a picture header, a slice header, a tile group header, a largest coding unit (LCU), a coding unit, a LCU row, a group of LCUs, a transform unit, a picture unit, or a video coding unit in the coded representation. In some embodiments, the characteristic of the video comprises a position of a coding unit, a picture unit, a transform unit, a block, or a video coding unit within the video. In some embodiments, the characteristic of the video comprises an indication of a color format of the video. In some embodiments, the characteristic of the video comprises a coding tree structure applicable to the video. In some embodiments, the characteristic of the video comprises a slice type, a tile group type, or a picture type of the video. In some embodiments, the characteristic of the video comprises color component of the video. In some embodiments, the characteristic of the video comprises a temporal layer identifier of the video. In some embodiments, the characteristic of the video comprises a profile, a level, or a tier of a video standard.

In some embodiments, the rule specifies that the size of the predictor palette is adjusted according to one or more counters of each entry in the predictor palette. In some embodiments, an entry having a counter smaller than a threshold T is discarded during the conversion, T being an integer. In some embodiments, entries with smallest counters are discarded until the size of the predictor palette is smaller than a threshold T, T being an integer.

In some embodiments, the rule specifies that the predictor palette is updated based on only a current palette used for the conversion. In some embodiments, the predicator palette is updated to be a current palette for a subsequent block after the conversion.

Figure 20:
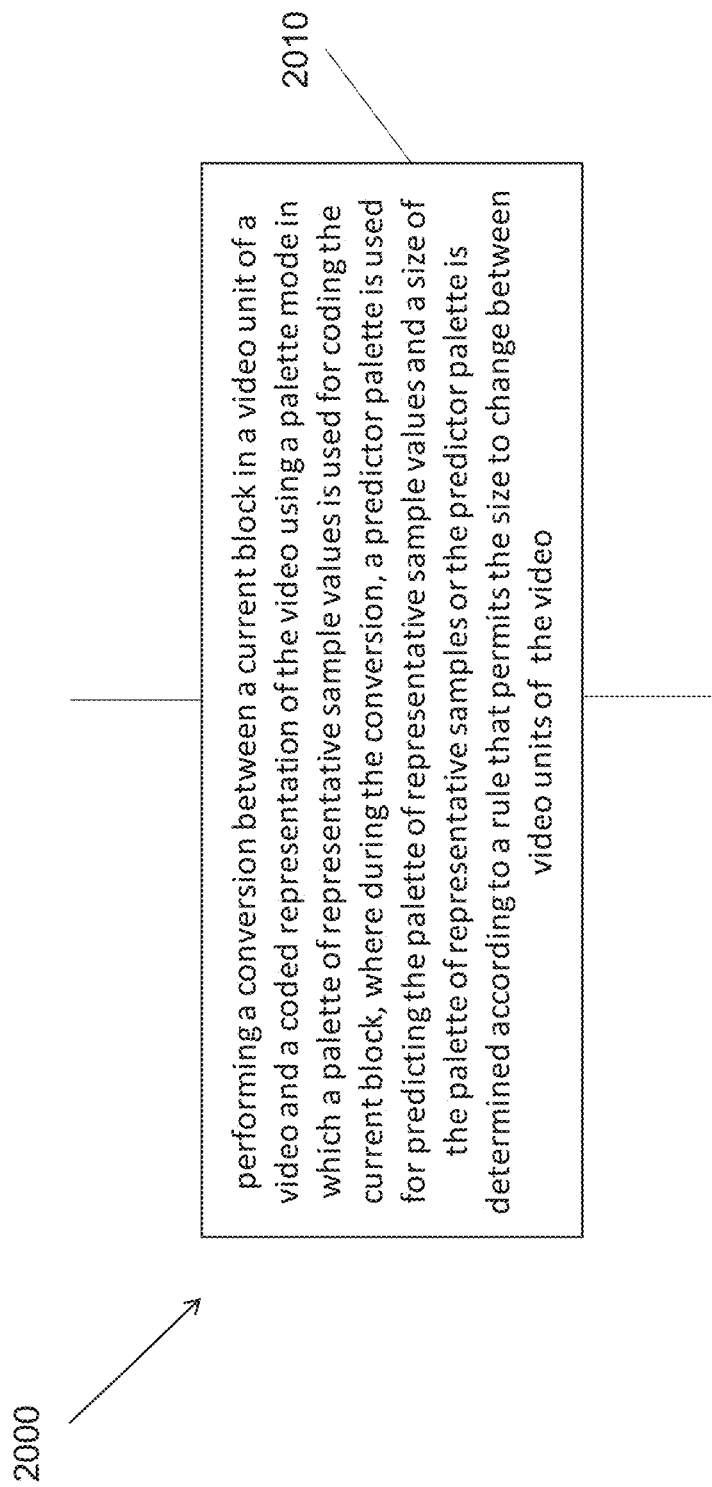
FIG. 20 is a flowchart representation of another method of video processing in accordance with the present technology.

FIG. 20 is a flowchart representation of a method 2000 of video processing in accordance with the present technology. The method 2000 includes, at operation 2010, performing a conversion between a current block in a video unit of a video and a coded representation of the video using a palette mode in which a palette of representative sample values is used for coding the current block. During the conversion, a predictor palette is used for predicting the palette of representative sample values and a size of the palette of representative samples or the predictor palette is determined according to a rule that permits the size to change between video units of the video.

In some embodiments, the video unit comprises a block, a coding unit, a coding tree unit, a tile, a brick, or a subpicture. In some embodiments, the size of the palette of representative samples or the predictor palette is determined further based on a characteristic of the current block or a neighboring block of the current block. In some embodiments, the characteristic comprises a dimension of the current block or the neighboring block. In some embodiments, the characteristic comprises at least a quantization parameter of the current block or the neighboring block. In some embodiments, the characteristic comprises a color component of the current block or the neighboring block.

In some embodiments, different sizes of the palette of representative samples or the predictor palette are used for different color components. In some embodiments, sizes of the palette of representative samples or the predictor palette for a luma component and chroma components are indicated in the coded representation. In some embodiments, the size of the palette of representative samples or the predictor palette for each color component is indicated in the coded representation. In some embodiments, signaling of the different sizes in the coded representation is based on usage of a dual tree partition, a slice type, or a picture type for the conversion.

Figure 21:
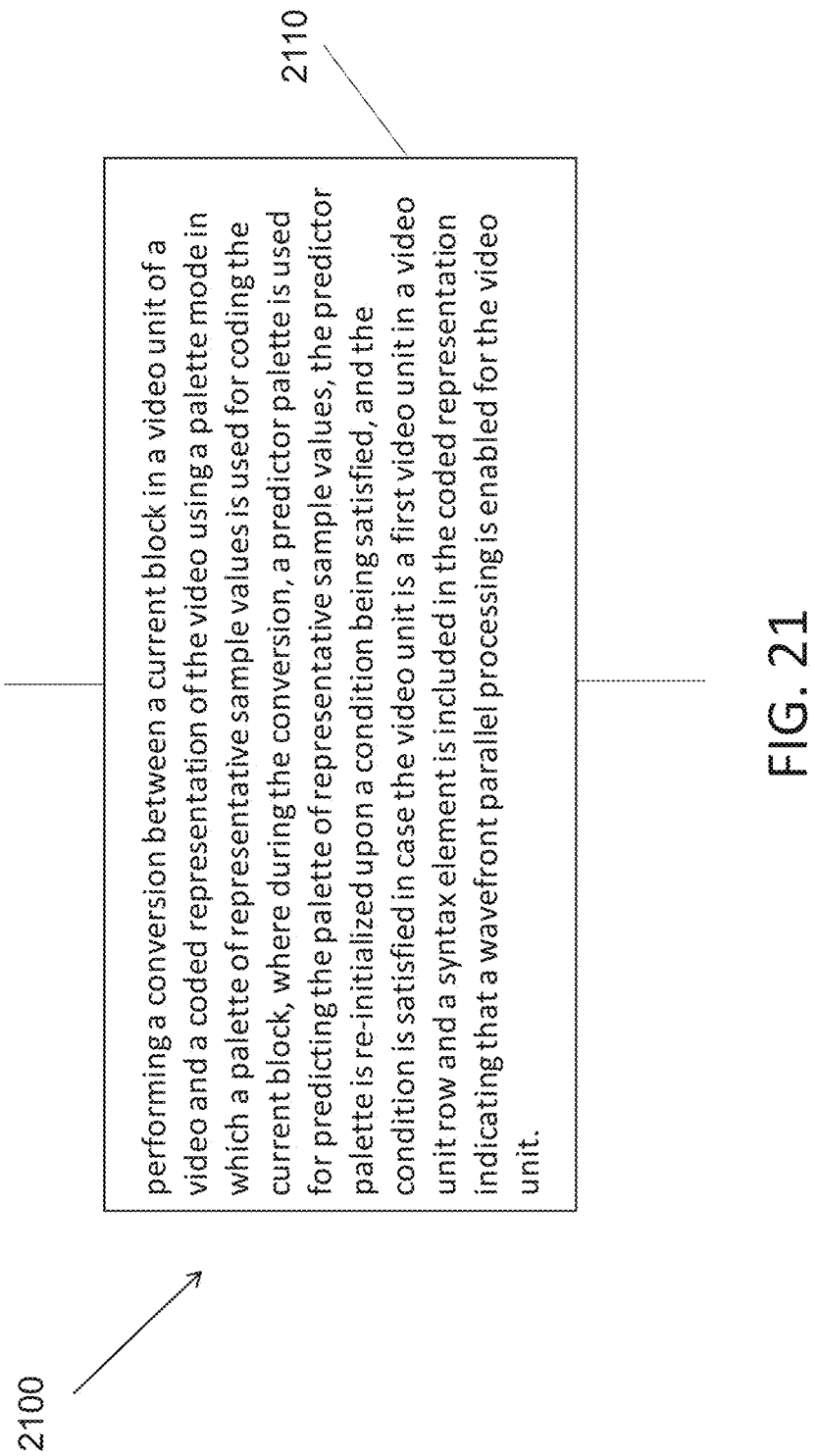
FIG. 21 is a flowchart representation of yet another method of video processing in accordance with the present technology.

FIG. 21 is a flowchart representation of a method 2100 of video processing in accordance with the present technology. The method 2100 includes, at operation 2110, performing a conversion between a current block in a video unit of a video and a coded representation of the video using a palette mode in which a palette of representative sample values is used for coding the current block. During the conversion, a predictor palette is used for predicting the palette of representative sample values. The predictor palette is re-initialized upon a condition being satisfied, where the condition is satisfied in case the video unit is a first video unit in a video unit row and a syntax element is included in the coded representation indicating that a wavefront parallel processing is enabled for the video unit.

In some embodiments, the video unit comprises a coding tree unit or a coding tree block. In some embodiments, the condition is satisfied in case the current block and a previous block are not in a same brick. In some embodiments, after the conversion of the video unit, at least one syntax element is maintained to record a size of the predictor palette and/or a number of entries in the predictor palette. In some embodiments, the at least one syntax element is used for the conversion of the current block.

In some embodiments, a storage process for context variables of the video is invoked in case (1) the current block is at a first column of a picture or (2) the current block and a previous block are not in a same brick. In some embodiments, outputs of the storage process comprise at least a size of the predictor palette or a number of entries of the predicator palette.

In some embodiments, applicability of one or more of the above methods is based on a characteristic of the video. In some embodiments, the characteristic of the video comprises a content of the video. In some embodiments, the characteristic of the video comprises information signaled in a decoder parameter set, a slice parameter set, a video parameter set, a picture parameter set, an adaptation parameter set, a picture header, a slice header, a tile group header, a largest coding unit (LCU), a coding unit, a LCU row, a group of LCUs, a transform unit, a picture unit, or a video coding unit in the coded representation. In some embodiments, the characteristic of the video comprises a position of a coding unit, a picture unit, a transform unit, a block, or a video coding unit within the video. In some embodiments, the characteristic of the video comprises a characteristic of a current block or a neighboring block of the current block. In some embodiments, the characteristic of a current block or neighboring blocks of the current block comprises a dimension of the current block or a dimension of the neighboring block of the current block. In some embodiments, the characteristic of the video comprises an indication of a color format of the video. In some embodiments, the characteristic of the video comprises a coding tree structure applicable to the video. In some embodiments, the characteristic of the video comprises a slice type, a tile group type, or a picture type of the video. In some embodiments, the characteristic of the video comprises color component of the video. In some embodiments, the characteristic of the video comprises a temporal layer identifier of the video. In some embodiments, the characteristic of the video comprises a profile, a level, or a tier of a video standard.

In some embodiments, the conversion comprises encoding the video into the coded representation. In some embodiments, the conversion comprises decoding the coded representation to generate pixel values of the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, for a conversion between a first video unit of a video comprising a luma block and two chroma blocks and a bitstream of the video, that a prediction mode is applied to the luma block and the two chroma blocks, respectively, wherein in the prediction mode, reconstructed samples are represented by a set of representative color values, and the set of representative color values comprises at least one of 1) palette predictors, 2) escaped samples, or 3) palette information included in the bitstream;
   constructing, a first palette for the luma block based on a first palette prediction table, wherein the first palette is used to derive the reconstructed samples of the luma block;
   constructing, a second palette for the two chroma blocks based on a second palette prediction table, wherein the second palette is used to derive the reconstructed samples of the two chroma blocks; and
   performing the conversion based on the first palette and the second palette;
   wherein the luma block and the two chroma blocks have tree type of dual tree,
   wherein indications of a size of the first palette and indications of a size of the second palette are explicitly signaled separately, and
   wherein sizes of the first palette prediction table and the second palette prediction table are implicitly signaled.

2. The method of claim 1, wherein maximum sizes of the first and the second palette prediction tables are fixed integer values.

3. The method of claim 1,
   wherein a size of the first palette prediction table and a size of the first palette change for different luma blocks, and a size of the second palette prediction table and a size of the second palette change for different chroma blocks.

4. The method of claim 1, wherein the size of the first palette and the size of the second palette are different.

5. The method of claim 1, wherein syntax elements used to derive the first palette and the second palette are included separately in the bitstream.

6. The method of claim 1, wherein the conversion includes encoding the first video unit into the bitstream.

7. The method of claim 1, wherein the conversion includes decoding the first video unit from the bitstream.

8. An apparatus for processing video data comprising a processor and a non-transitory memory with instructions thereon, wherein the instructions upon execution by the processor, cause the processor to:
   determine, for a conversion between a first video unit of a video comprising a luma block and two chroma blocks and a bitstream of the video, that a prediction mode is applied to the luma block and the two chroma blocks, respectively, wherein in the prediction mode, reconstructed samples are represented by a set of representative color values, and the set of representative color values comprises at least one of 1) palette predictors, 2) escaped samples, or 3) palette information included in the bitstream;
   construct, a first palette for the luma block based on a first palette prediction table, wherein the first palette is used to derive the reconstructed samples of the luma block;
   construct, a second palette for the two chroma blocks based on a second palette prediction table, wherein the second palette is used to derive the reconstructed samples of the two chroma blocks; and
   perform the conversion based on the first palette and the second palette;
   wherein the luma block and the two chroma blocks have tree type of dual tree,
   wherein indications of a size of the first palette and indications of a size of the second palette are explicitly signaled separately, and
   wherein sizes of the first palette prediction table and the second palette prediction table are implicitly signaled.

9. The apparatus of claim 8, wherein maximum sizes of the first and the second palette prediction tables are fixed integer values.

10. The apparatus of claim 8, wherein a size of the first palette prediction table and a size of the first palette change for different luma blocks, and a size of the second palette prediction table and a size of the second palette change for different chroma blocks.

11. The apparatus of claim 8, wherein the size of the first palette and the size of the second palette are different.

12. The apparatus of claim 8, wherein syntax elements used to derive the first palette and the second palette are included separately in the bitstream.

13. A non-transitory computer-readable storage medium storing instructions that cause a processor to:
   determine, for a conversion between a first video unit of a video comprising a luma block and two chroma blocks and a bitstream of the video, that a prediction mode is applied to the luma block and the two chroma blocks, respectively, wherein in the prediction mode, reconstructed samples are represented by a set of representative color values, and the set of representative color values comprises at least one of 1) palette predictors, 2) escaped samples, or 3) palette information included in the bitstream;
   construct, a first palette for the luma block based on a first palette prediction table, wherein the first palette is used to derive the reconstructed samples of the luma block;
   construct, a second palette for the two chroma blocks based on a second palette prediction table, wherein the second palette is used to derive the reconstructed samples of the two chroma blocks; and
   perform the conversion based on the first palette and the second palette;
   wherein the luma block and the two chroma blocks have tree type of dual tree,
   wherein indications of a size of the first palette and indications of a size of the second palette are explicitly signaled separately, and
   wherein sizes of the first palette prediction table and the second palette prediction table are implicitly signaled.

14. A non-transitory computer-readable recording medium storing a bitstream of a video which is generated by a method performed by a video processing apparatus, wherein the method comprises:
   determining, for a first video unit of a video comprising a luma block and two chroma blocks, that a prediction mode is applied to the luma block and the two chroma blocks, respectively, wherein in the prediction mode, reconstructed samples are represented by a set of representative color values, and the set of representative color values comprises at least one of 1) palette predictors, 2) escaped samples, or 3) palette information included in the bitstream;
   constructing, a first palette for the luma block based on a first palette prediction table, wherein the first palette is used to derive the reconstructed samples of the luma block;
   constructing, a second palette for the two chroma blocks based on a second palette prediction table, wherein the second palette is used to derive the reconstructed samples of the two chroma blocks; and
   generating the bitstream based on the first palette and the second palette;
   wherein the luma block and the two chroma blocks have tree type of dual tree,
   wherein indications of a size of the first palette and indications of a size of the second palette are explicitly signaled separately, and
   wherein sizes of the first palette prediction table and the second palette prediction table are implicitly signaled.

15. The method of claim 1, wherein the first or the second palette prediction table has different maximum sizes for video blocks with a tree type of single tree and a tree type of dual tree.

16. The method of claim 1, wherein the first palette prediction table is updated based on the first palette, and
   wherein the second palette prediction table is updated based on the second palette.

17. The apparatus of claim 8, wherein the first or the second palette prediction table has different maximum sizes for video blocks with a tree type of single tree and a tree type of dual tree.

18. The apparatus of claim 8, wherein the first palette prediction table is updated based on the first palette, and
   wherein the second palette prediction table is updated based on the second palette.

19. The apparatus of claim 8, wherein the conversion includes encoding the first video unit into the bitstream.

20. The apparatus of claim 8, wherein the conversion includes decoding the first video unit from the bitstream.

* * * * *